US010645068B2

(12) United States Patent
Bonnell et al.

(10) Patent No.: US 10,645,068 B2
(45) Date of Patent: May 5, 2020

(54) METHODS AND SYSTEMS FOR SECURE DIGITAL CREDENTIALS

(71) Applicant: United States Postal Service, Washington, DC (US)

(72) Inventors: Clayton C Bonnell, Fairfax, VA (US); Kelley A Sullivan, Washington, DC (US)

(73) Assignee: United States Postal Service, Washington, DC (US)

(*) Notice: Subject to any disclaimer, the term of this patent is extended or adjusted under 35 U.S.C. 154(b) by 212 days.

(21) Appl. No.: 15/387,473

(22) Filed: Dec. 21, 2016

(65) Prior Publication Data

US 2017/0187701 A1    Jun. 29, 2017

Related U.S. Application Data

(60) Provisional application No. 62/271,927, filed on Dec. 28, 2015.

(51) Int. Cl.
| | |
|---|---|
| H04L 29/06 | (2006.01) |
| G06Q 10/06 | (2012.01) |
| H04W 12/00 | (2009.01) |

(52) U.S. Cl.
CPC ........... H04L 63/08 (2013.01); G06Q 10/063 (2013.01); H04L 63/083 (2013.01);
(Continued)

(58) Field of Classification Search
CPC ... H04L 63/08; H04L 63/083; H04L 63/0853; H04L 63/0892; H04L 63/102; H04L 63/107; H04L 63/18; H04L 29/06
(Continued)

(56) References Cited

U.S. PATENT DOCUMENTS

| | | |
|---|---|---|
| 4,868,757 A | 9/1989 | Gil |
| 5,062,645 A | 11/1991 | Goodman et al. |

(Continued)

FOREIGN PATENT DOCUMENTS

| | | | |
|---|---|---|---|
| EP | 2916520 A1 | 9/2015 | |
| JP | 5377494 B2 | 12/2013 | |
| WO | WO 2015/183783 A1 | 12/2015 | |

OTHER PUBLICATIONS

International Search Report and Written Opinion dated Jun. 28, 2016 for International Patent Application No. PCT/US2016/021854 which shares priority of U.S. Appl. No. 62/133,173, filed Mar. 13, 2015 with subject U.S. Appl. No. 15/066,945.

(Continued)

Primary Examiner — Saleh Najjar
Assistant Examiner — Khalid M Almaghayreh
(74) Attorney, Agent, or Firm — Knobbe, Martens, Olson & Bear, LLP

(57) ABSTRACT

Methods and systems for resetting a digital credential within a digital credential based authentication system. The method includes logging a first administrative user into the digital credential system, receiving, from the first administrative user, a first portion of authentication credentials for a first customer, validating, by the first administrative user using the digital credential system, the first portion, logging a second administrative user into the digital credential system, receiving, from the second administrative user, a second portion of authentication credentials for the first customer, receiving the second portion by the second administrative user, validating, by the second administrative user using the digital credential system, the second portion; and resetting the authentication credentials based on the validation of the first portion and second portion.

19 Claims, 14 Drawing Sheets

(52) U.S. Cl.
CPC ...... *H04L 63/0853* (2013.01); *H04L 63/0892* (2013.01); *H04L 63/102* (2013.01); *H04L 63/107* (2013.01); *H04L 63/18* (2013.01); *H04L 63/06* (2013.01); *H04L 2463/082* (2013.01); *H04W 12/00503* (2019.01)

(58) Field of Classification Search
USPC ....... 726/2, 18, 27–30, 7, 176, 182; 713/169
See application file for complete search history.

(56) References Cited

U.S. PATENT DOCUMENTS

| | | | |
|---|---|---|---|
| 5,699,257 | A | 12/1997 | Emmett et al. |
| 6,088,717 | A | 7/2000 | Reed et al. |
| 6,333,917 | B1 | 12/2001 | Lyon et al. |
| 6,529,908 | B1 | 3/2003 | Piett et al. |
| 7,797,543 | B1 | 9/2010 | Campbell et al. |
| 7,831,518 | B2 | 11/2010 | Montgomery et al. |
| 7,831,833 | B2* | 11/2010 | Gaylor .................... G06F 21/31 380/277 |
| 7,840,414 | B1 | 11/2010 | Parenti et al. |
| 8,042,163 | B1 | 10/2011 | Karr et al. |
| 8,286,221 | B2 | 10/2012 | Muller et al. |
| 8,346,929 | B1 | 1/2013 | Lai |
| 8,401,522 | B2* | 3/2013 | Crawford ................ G06F 21/31 455/410 |
| 8,423,437 | B2 | 4/2013 | Benisti et al. |
| 8,819,810 | B1* | 8/2014 | Liu ......................... G06F 21/31 726/18 |
| 8,862,181 | B1 | 10/2014 | Cope et al. |
| 9,350,717 | B1* | 5/2016 | Siddiqui ................. H04L 63/08 |
| 9,516,470 | B1 | 12/2016 | Scofield et al. |
| 9,525,972 | B2 | 12/2016 | Raounak |
| 9,531,707 | B1 | 12/2016 | Daniel |
| 9,866,544 | B2 | 1/2018 | Raounak |
| 10,075,847 | B1 | 9/2018 | Moreton et al. |
| 10,206,099 | B1* | 2/2019 | Trinh .................... H04W 12/06 |
| 2002/0065695 | A1 | 5/2002 | Francoeur et al. |
| 2004/0064423 | A1 | 4/2004 | Rozendaal et al. |
| 2005/0018167 | A1 | 1/2005 | Hennus et al. |
| 2005/0033993 | A1* | 2/2005 | Cooper ................... G06F 21/31 726/19 |
| 2005/0278264 | A1 | 12/2005 | Jacobson et al. |
| 2006/0021018 | A1 | 1/2006 | Hinton et al. |
| 2006/0026418 | A1 | 2/2006 | Bade et al. |
| 2006/0080195 | A1 | 4/2006 | Karabulut |
| 2007/0072564 | A1 | 3/2007 | Adams |
| 2007/0118603 | A1 | 5/2007 | Washburn et al. |
| 2007/0136178 | A1 | 6/2007 | Wiseman et al. |
| 2007/0174215 | A1 | 7/2007 | Morel |
| 2007/0236749 | A1 | 10/2007 | Henry et al. |
| 2007/0250914 | A1* | 10/2007 | Fazal ...................... G06F 21/31 726/5 |
| 2008/0103979 | A1 | 5/2008 | Chatte |
| 2008/0104411 | A1* | 5/2008 | Agrawal ............. H04L 63/0846 713/183 |
| 2008/0109651 | A1 | 5/2008 | Duda et al. |
| 2009/0103702 | A1 | 4/2009 | Allen et al. |
| 2009/0132490 | A1 | 5/2009 | Okraglik |
| 2009/0158404 | A1 | 6/2009 | Hahn et al. |
| 2010/0115266 | A1 | 5/2010 | Guo et al. |
| 2010/0122212 | A1 | 5/2010 | Boudalier |
| 2010/0293111 | A1 | 11/2010 | Van Gorp et al. |
| 2011/0029459 | A1 | 2/2011 | Schneider et al. |
| 2011/0035337 | A1 | 2/2011 | Choi et al. |
| 2012/0232970 | A1 | 9/2012 | Kara |
| 2013/0013921 | A1 | 1/2013 | Bhathena et al. |
| 2013/0036458 | A1* | 2/2013 | Liberman ............. H04L 9/3231 726/6 |
| 2013/0117507 | A1 | 5/2013 | Chiang |
| 2013/0198060 | A1 | 8/2013 | Whitehouse |
| 2013/0198818 | A1* | 8/2013 | Hitchcock ............... G06F 21/41 726/5 |
| 2013/0198822 | A1* | 8/2013 | Hitchcock ............. G06F 21/335 726/6 |
| 2013/0198824 | A1* | 8/2013 | Hitchcock ............... G06F 21/00 726/6 |
| 2013/0297931 | A1 | 11/2013 | Campbell et al. |
| 2014/0109206 | A1* | 4/2014 | Goel ........................ H04L 63/20 726/6 |
| 2014/0189808 | A1* | 7/2014 | Mahaffey ............. H04L 63/083 726/4 |
| 2014/0258098 | A1 | 9/2014 | Felix et al. |
| 2014/0331282 | A1* | 11/2014 | Tkachev ................. H04L 63/08 726/3 |
| 2015/0076043 | A1 | 3/2015 | Serjeantson et al. |
| 2015/0095352 | A1 | 4/2015 | Lacey |
| 2015/0096813 | A1 | 4/2015 | Aumente |
| 2015/0183783 | A1 | 7/2015 | Chan et al. |
| 2015/0242616 | A1* | 8/2015 | Oprea .................... G06F 21/445 726/1 |
| 2015/0256973 | A1* | 9/2015 | Raounak ............... H04W 4/029 726/7 |
| 2015/0287113 | A1 | 10/2015 | Dearing et al. |
| 2015/0326543 | A1 | 11/2015 | Pochuev et al. |
| 2016/0018253 | A1 | 1/2016 | O'Neil |
| 2016/0073019 | A1 | 3/2016 | Nowicki et al. |
| 2016/0140493 | A1 | 5/2016 | Dixon et al. |
| 2016/0173501 | A1* | 6/2016 | Brown ................. G06F 21/6245 726/4 |
| 2016/0228922 | A1 | 8/2016 | Snead |
| 2016/0267558 | A1 | 9/2016 | Bonnell et al. |
| 2016/0300187 | A1 | 10/2016 | Kashi et al. |
| 2017/0046526 | A1 | 2/2017 | Chan et al. |
| 2017/0063829 | A1 | 3/2017 | Raounak |
| 2017/0140174 | A1 | 5/2017 | Lacey et al. |
| 2017/0142082 | A1* | 5/2017 | Qian ........................ G06F 21/62 |
| 2017/0264777 | A1 | 9/2017 | Irons et al. |
| 2017/0324738 | A1 | 11/2017 | Hari et al. |
| 2017/0331818 | A1 | 11/2017 | Kader et al. |
| 2017/0346639 | A1 | 11/2017 | Muftic |
| 2018/0007131 | A1 | 1/2018 | Cohn et al. |
| 2018/0060535 | A1 | 3/2018 | Reicher |
| 2018/0091493 | A1 | 3/2018 | Raounak |
| 2018/0205718 | A1* | 7/2018 | Moran .................... G06Q 20/20 |
| 2018/0329903 | A1 | 11/2018 | Irons et al. |
| 2019/0045077 | A1 | 2/2019 | Irons et al. |

OTHER PUBLICATIONS

International Search Report and Wrtitten Opinion dated Jan. 17, 2018 for International Patent Application PCT/US2017/52258.

International Search Report and Written Opinion dated May 23, 2017 for International Patent Application No. PCT/US2016/068314.

USPS (Barcode, Package, Intelligent Mail Specification), Dec. 29, 2011, Rev E (Year: 2011).

International Preliminary Report on Patentability dated Mar. 26, 2019 for International Patent Application No. PCT/US2017/052258.

Josang et al.; Trust requirements in identity management; Published in: Proceeding ACSW Frontiers '05 Proceedings of the 2005 Australasian workshop on Grid computing and e-research; vol. 44 pp. 99-108; ACM Digital Library (Year: 2005).

Schmidt et al.' Deco Arch: Trust and Reputation Aware Service Brokering Architecture in Digital Ecosystems; Published in: 2007 Inaugural IEEE-IES Digital EcoSystems and Technologies Conference; Date of Conference: Feb. 21-23, 2007; IEEE Xplore (Year: 2007).

* cited by examiner

METHODS AND SYSTEMS FOR SECURE DIGITAL CREDENTIALS

CROSS REFERENCE TO RELATED APPLICATIONS

This application claims priority to U.S. Provisional Application No. 62/271,927, filed Dec. 28, 2015 and entitled "METHODS AND SYSTEMS FOR DATA AUTHENTICATION SERVICES." The content of this priori application is considered part of this application, and is hereby incorporated by reference in its entirety.

FIELD

This disclosure relates to digital credentials for securing access to electronic resources, such as electronic accounts, database, and the like.

BACKGROUND

The means to securely interact with digital systems is typically via the use of digital credentials. Digital credentials commonly take the form of a user name and associated password. Unfortunately, it is not uncommon for people to forget portions or all of the information that comprises their digital credentials. When this occurs, the digital credentials may be reinitialized, or reset, such that the individual can regain access to their account.

Changing digital credentials when they are innocently forgotten by a user can present security vulnerabilities. For example, if an imposter is able to successfully reset credentials on an account to those of their own choosing, they can then gain access to the account, and any resources that the account may provide. For example, once the account is compromised, it may be used to send spam email on behalf of the intruder. In cases of computer accounts being compromised, the resources of the computer may be utilized in botnet style attacks against other computers on a network. Furthermore, not only does resetting account credentials open security vulnerabilities, but costs associated with maintaining systems and processes to provide a secure account credential reset capability can be substantial. Therefore, there is a need for improved methods of maintaining and securing electronic accounts.

SUMMARY

Methods and apparatuses or devices disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the described features being described provide advantages that include data authentication services.

One aspect disclosed is a method for improving the security of a digital credential based authentication system. The method includes logging a first administrative user into the digital credential based authentication system, receiving, from the first administrative user, a first portion of authentication credentials for a first customer, validating, by the first administrative user using the digital credential system, the first portion, logging a second administrative user into the digital credential system, receiving, from the second administrative user, a second portion of authentication credentials for the first customer, receiving the second portion by the second administrative user, validating, by the second administrative user using the digital credential system, the second portion; and resetting the authentication credentials based on the validation of the first portion and the second portion.

In some aspects, the method includes preventing validation of the second portion by the first administrative user. In some aspects, the method includes selecting, by the first administrative user, a physical location for validation of the second portion of the authentication credentials, verifying, by the digital credential system, that the receiving of the second portion of the authentication credentials occurs at a selected physical location; and validating, by the digital credential system, the second portion in response to verifying that the receiving of the second portion of the authentication credentials occurs at the selected physical location.

In some aspects, verifying the receiving occurs at the selected physical location comprises receiving GPS coordinates from a terminal of the logged in second administrative user, and determining whether the received GPS coordinates are equivalent to the selected physical location. In some aspects, the first portion includes at least one or more of a first requestor name, a first customer account name, a first identification type, a first requestor address, a global positioning system coordinate, a first phone number, and a transaction address.

Another aspect disclosed is an apparatus for improving the security of a digital credential based authentication system. The apparatus includes one or more electronic hardware processors, a memory, operably connected to the one or more processors, and storing instructions that configure the one or more electronic hardware processors to: log a first administrative user into the digital credential system, receive, from the first administrative user, a first portion of authentication credentials for a first customer, validate, by the first administrative user using the digital credential system, the first portion, log a second administrative user into the digital credential system, receive, from the second administrative user, a second portion of authentication credentials for the first customer, receive the second portion by the second administrative user, validate, by the second administrative user using the digital credential system, the second portion; and reset the authentication credentials based on the validation of the first portion and second portion.

In some aspects, the memory further stores instructions that configure the one or more electronic hardware processors to prevent validation of the second portion by the first administrative user in response to the validation of the first portion by the first administrative user. In some aspects, the memory further stores instructions that configure the one or more electronic hardware processors to: select by the first administrative user, a physical location for validation of the second portion of the authentication credentials, verify, by the digital credential system, that the receiving of the second portion of the authentication credentials occurs at a selected physical location; and validate, by the digital credential system, the second portion in response to verifying that the receiving of the second portion of the authentication credentials occurs at the selected physical location.

In some aspects, verifying the receiving occurs at the selected physical location comprises receiving GPS coordinates from a terminal of the logged in second administrative user, and determining whether the received GPS coordinates are equivalent to the selected physical location. In some aspects, the first portion includes at least one or more of a first requestor name, a first customer account name, a first identification type, a first requestor address, a global positioning system coordinate, a first phone number, and a transaction address.

Another aspect disclosed is a method of improving the security of a web service accessible digital credential. The method includes receiving, by a digital credential system, a login from a first administrative user via a first electronic device, receiving, by the digital credential system, a digital credential reset request message for a user account from the first administrative user, the message indicating a physical location for an identity verification to occur, and an identification type to use for the identity verification, receiving, via the digital credential system, a login from a second administrative user from a second electronic device at the indicated physical location, displaying, via the digital credential system, at a terminal associated with the second administrative user, the indication of the identification type to use for the identity verification, receiving, via the digital credential system, an indication of whether the indicated identification type was verified, generating, via the digital credential system, a digital credential reset response message based on the verification indication; and transmitting, via the digital credential system, the response message.

In some aspects, the method also includes displaying, simultaneously with the indicated identification type, a photograph associated with the user at the terminal. In some aspects, the request message includes at least one of a customer name, a transaction code, a customer account name, an identification type, a customer address, a transaction address, a global positioning system coordinate associated with the transaction address, and a customer phone number. In some aspects, the indicated identification type is a government-issued identification that includes at least one of a photograph, a voice sample, a fingerprint, and a retinal scan.

Another aspect disclosed is an apparatus for improving the security of a digital credential. The apparatus includes one or more electronic hardware processors, a memory, operably connected to the one or more processors, and storing instructions that configure the one or more electronic hardware processors to: receive, by a digital credential system, a login from a first administrative user via a first electronic device, receive, by the digital credential system, a digital credential reset request message from the first administrative user, the message indicating a physical location for an identity verification to occur, and an identification type to use for the identity verification, receive, via the digital credential system, a login from a second administrative user from a second electronic device at the indicated physical location, display, via the digital credential system, at a terminal associated with the second administrative user, an indication of the identification type to use for the identity verification, receive, via the digital credential system, an indication of whether the indicated identification type was verified, generate, via the digital credential system, a digital credential reset response message based on the verification indication; and transmit, via the digital credential system, the response message.

In some aspects, the memory stores further instructions for the one or more processors that when executed, cause the one or more processors to display, simultaneously with the indicated identification type, a photograph associated with the user. In some aspects, the request message includes at least one of a customer name, a transaction code, a customer account name, an identification type, a customer address, a transaction address, a global positioning system coordinate associated with the transaction address, and a customer phone number. In some aspects, the indicated identification type is a government-issued identification that includes at least one of a voice sample, a photograph, a fingerprint, and a retinal scan.

BRIEF DESCRIPTION OF THE DRAWINGS

These drawings and the associated description herein are provided to illustrate specific embodiments of the invention and are not intended to be limiting.

DETAILED DESCRIPTION

As described above, the electronic postmark provides many benefits. Some electronic postmarks as previously introduced also have some shortcomings. For example, given the maturity of digital signatures in the electronic document market, the known electronic postmark offers limited value over and above these existing capabilities. Additionally, while the electronic postmark offers time stamping of electronic documents, many alternative time stamping solutions are also available. Furthermore, existing electronic postmarking solutions do not provide encryption, and may provide limited assurance and trust of sender identities.

While existing electronic postmark solutions can determine whether an electronic document has changed since the postmark was created, they are unable to identify the portion of the document that has changed. Nor do they generally provide audit trails of changes to the document that have occurred since the electronic postmark was created.

There is also a lack of available workflow tools in the marketplace to facilitate use of the electronic postmark. Few enterprise solutions presently include or use the current electronic postmark. Therefore, application of an EPM to an electronic document is performed as an external and additional process to existing document workflow models. This results in a generally unfriendly user experience, reducing adoption of the electronic postmark.

To address the issues identified above, methods and systems are disclosed that implement a new technical framework for deploying solutions that take advantage of electronic postmarking capabilities. This framework addresses core challenges experienced by senders and recipients when communicating securely. The disclosed EPM standards framework addresses:

Who or where did the message come from?
Who signed the message?
When was the message sent?
Who received the message?
Has the content of the message been altered?
Is my personal information protected?
Is my personal information only shared when truly needed and with my permission?
When was the message received?
Can anyone other than the intended recipient read the message?
Can I trust the digital identity credential?
Can I prove the digital signature/will it hold up in court?

Figure 1A:
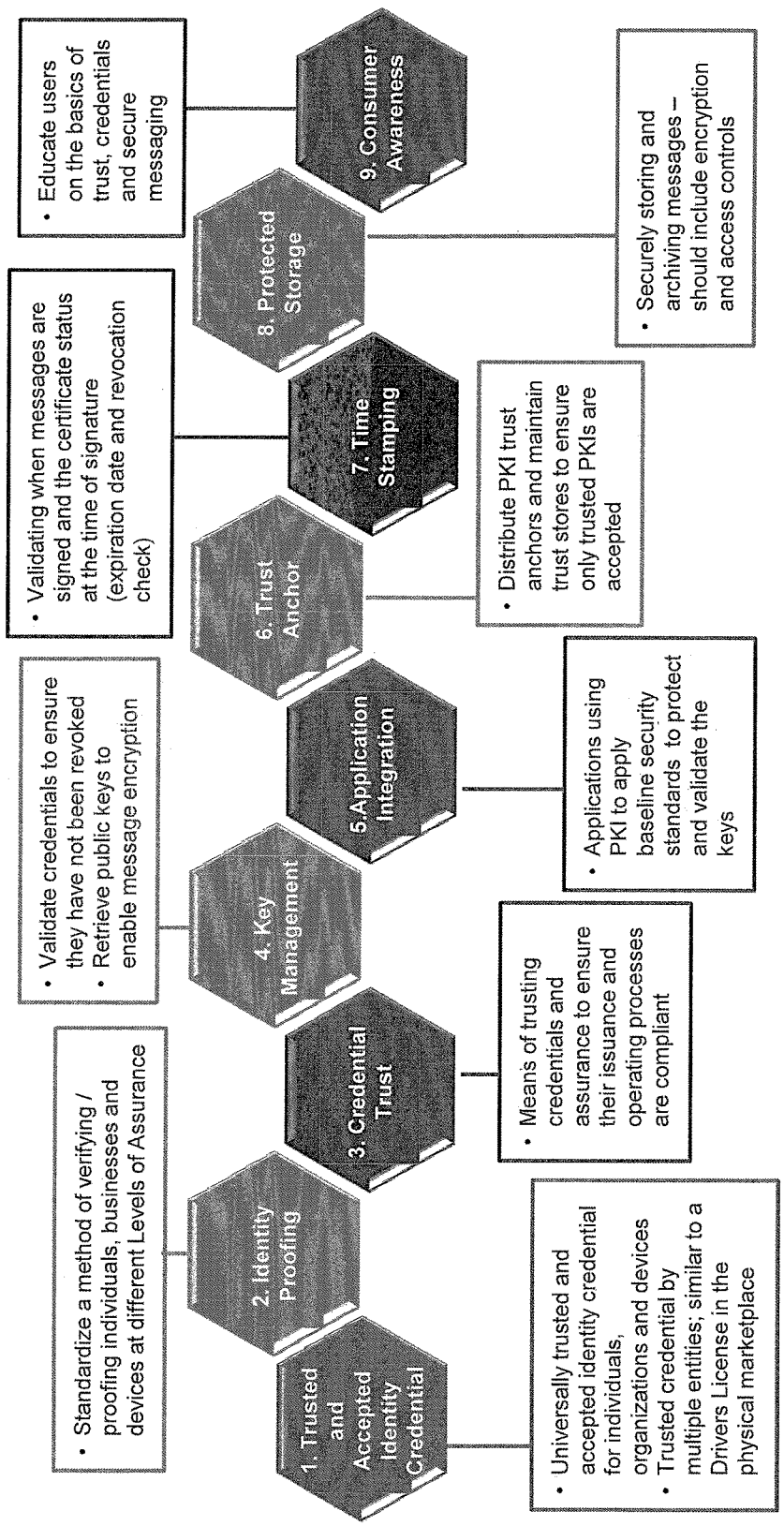
FIG. 1A is a diagram of a proposed EPM standards framework.

FIG. 1A shows an EPM standards framework. The disclosed framework includes at least nine components as shown below:
1. Trusted and Accepted Identity Credential
   a. Universally trusted and accepted identity credential for individuals, organizations and devices
   b. Trusted credential by multiple entities; similar to a Driver's License in the physical marketplace.
2. Identity Proofing
   a. Standardizes a method of verifying/proofing individuals, businesses, and devices at different level so assurance.
3. Credential Trust
   a. Ensures credentialed organizations are in compliance with the framework's standards.
4. Key Management
   a. Validates credentials
   b. Retrieves public keys for use in message encryption
5. Application Integration
   a. Applications using PKI to apply baseline security standards to protect and validate keys.
6. Trust Anchor
   a. Distribute PKI trust anchors and maintain trust stores to ensure only trusted PKIs are accepted
7. Time Stamping
   a. Validates when messages are signed and a certificate status at the time of signature (expiration date and revocation check)
8. Protected Storage
   a. Securely stores and archives messages, including encryption and access controls
9. Consumer Awareness
   a. Educates users on the basics of trust, credentials, and secure messaging.

Figure 1B:
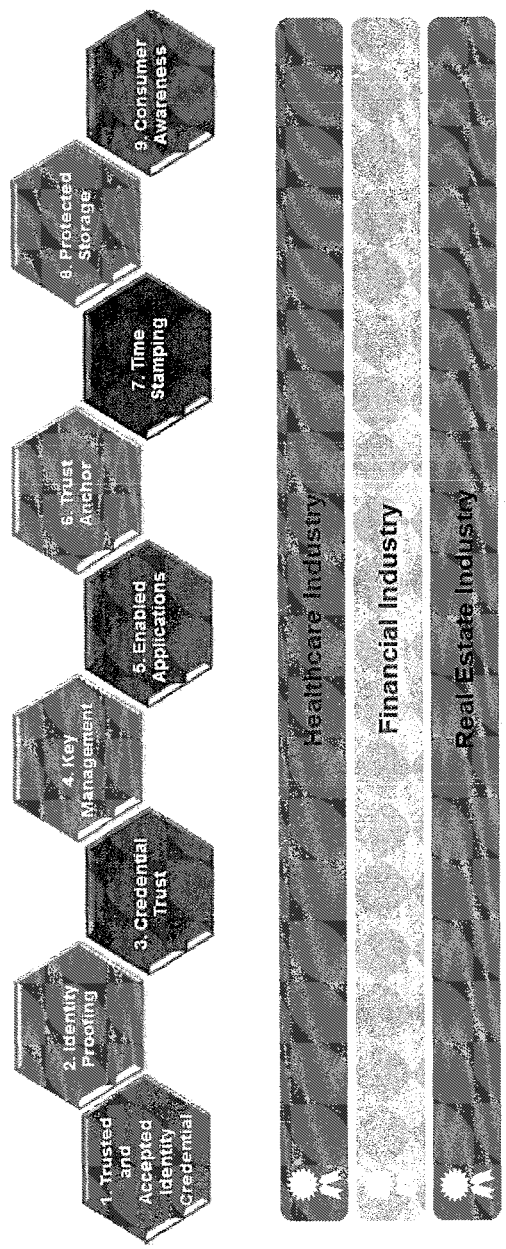
FIG. 1B is a diagram showing that the nine components of the electronic postmark framework may be leveraged across multiple industry segments, including healthcare, financial, and real estate.

FIG. 1B shows that the nine components of the electronic postmark framework may be leveraged across multiple industry segments, including healthcare, financial, and real estate.

Figure 2:
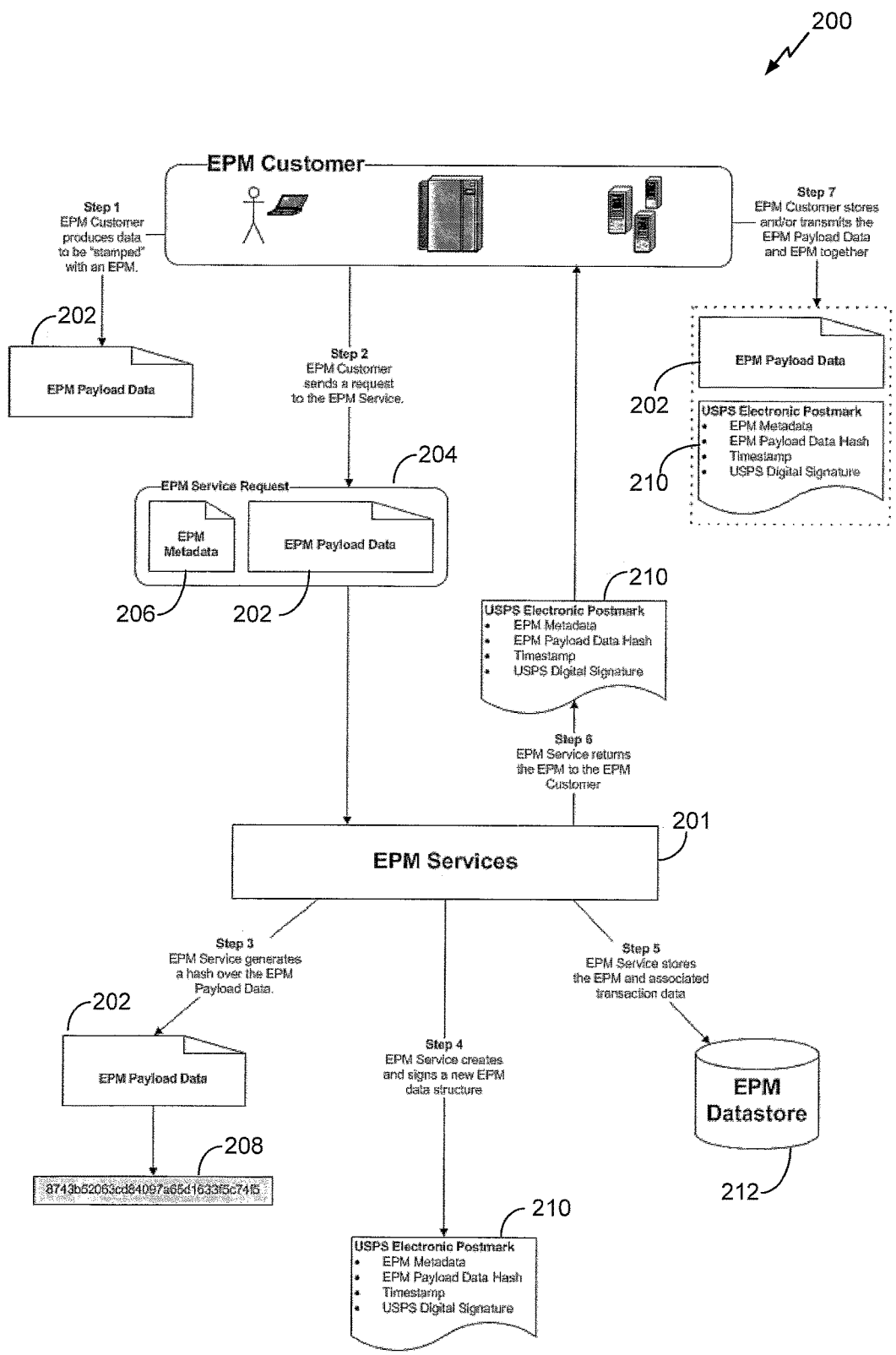
FIG. 2 is a flow chart of a method for an EPM customer to obtain electronic postmark services from an electronic postmark services component.

FIG. 2 is a process flow diagram showing one example of an EPM customer obtaining electronic postmark services from an electronic postmark services component 201. The electronic postmark services component provides a network communication interface that allows network clients to obtain electronic postmarks for a variety of types of electronic data. In fact, almost any type of electronic data may be protected using an electronic postmark using the electronic postmark services component.

In step 1, the EPM customer produces data 202 to be "stamped" with an electronic postmark. The payload data 202 may be any electronic data. In step 2, the EPM customer initiates a request to an electronic postmark service 201. The request may include an EPM service request 204. The EPM service request 204 may include both EPM metadata 206 and the EPM payload data 202.

Upon receiving the EPM service request 204, the EPM services component 201 generates a hash 208 for the EPM payload data 202 in step 3. The EPM service component 201 also creates and digitally signs a new electronic postmark structure 210 in step 4. The electronic postmark structure includes EPM metadata 206, the EPM payload data hash 208, a timestamp, and the digital signature. The EPM Services component 201 then stores the EPM structure 210 in an EPM Data store 212 in step 5. In step 6, the EPM services 201 returns the electronic postmark 210 to the customer. In step 7 the customer may store and/or transmit the EPM payload data 202 and EPM 210 together as a single set of bits.

Figure 3:
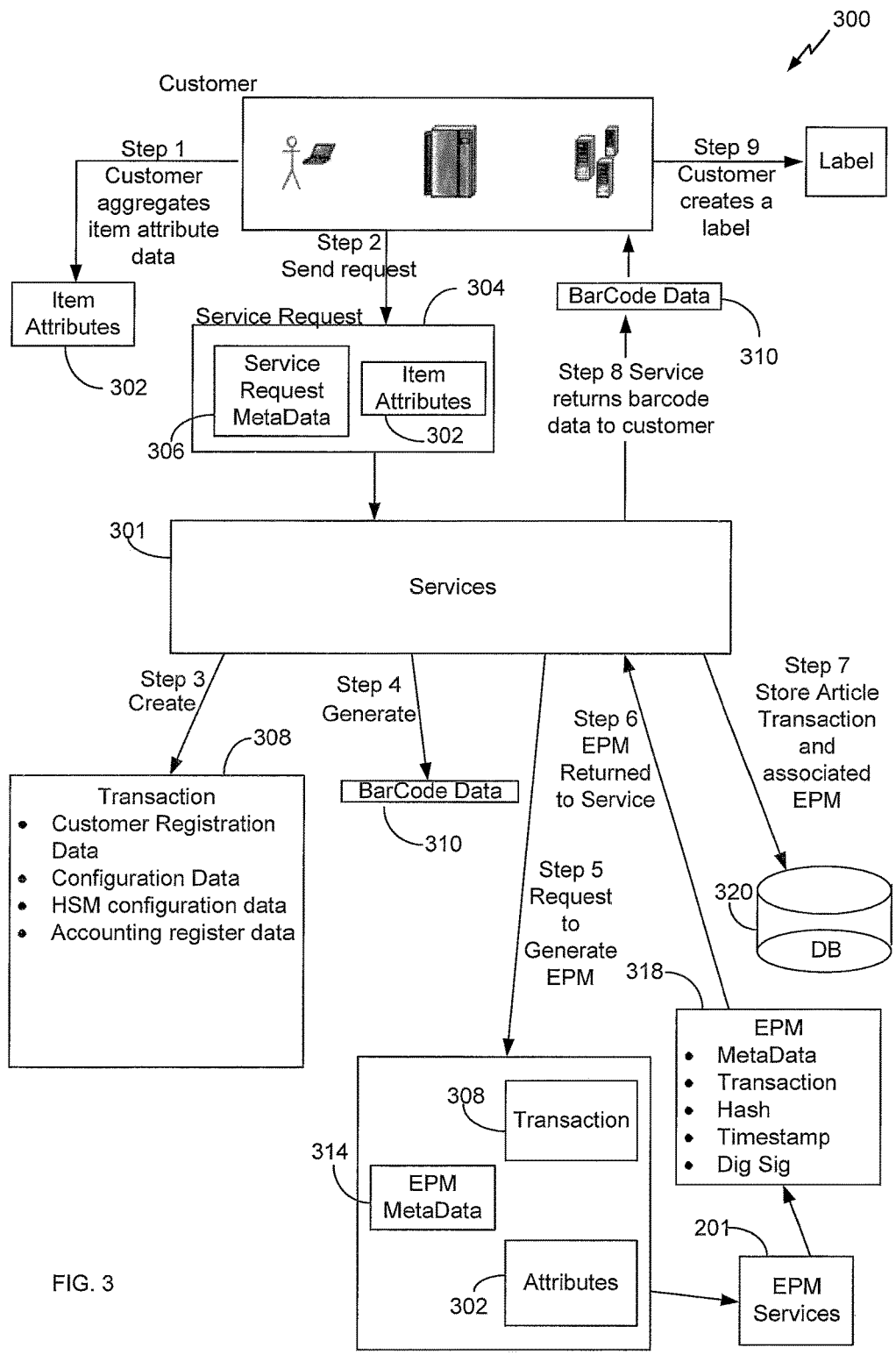
FIG. 3 is a flow chart for a method of managing information relating to a mail piece via a digital evidencing system services component.

FIG. 3 shows a process flow for a method of managing information relating to an item via a services component 301. In some aspects, the item may be a mail piece. In other aspects, an item may be any physical good. The services component 301 provides a network communication based interface for obtaining a Barcode over the communications network. In some aspects, the barcode may be an intelligent mail package barcode (IMpb).

In step 1, a customer aggregates attributes 302 of an item, such as a mail piece. Attributes may include information relating to a sender of the item, destination of the item, the weight of the item, additional services requested for the item, etc. In step 2, a customer initiates a service request 304 to the service component 301. The service request 304 may contain service request metadata 306 and the attributes 302.

Upon receiving the service request 304 as part of step 2, the services component 301 may create a transaction record 308 in step 3. The transaction record may include one or more of customer registration data, system configuration data, health system model (HSM) configuration data, and accounting register data. The attribute information 302 may also be included in the transaction record 308.

The services component 301 may then create barcode data 310 for the transaction in step 4. The services component 301 may then generate an electronic postmark in step 5. In some aspects, the services component 301 may generate an EPM service request 312 and transmit the service request 312 to an EPM services component, such as the EPM services component 201 described above with respect to FIG. 2.

The EPM service request 312 may include EPM metadata 314 and EPM payload data 316. In some aspects, the EPM metadata 314 may include EPM payload metadata. This metadata may specify, for example, information about the origin of the item, information about the recipient of the item, an identifier of the mailer of the item, and an identifier of the provider of the item.

In some aspects, the EPM payload data 316 may include the item transaction record 308. The EPM payload data 316 may also include the intelligent mail package barcode (IMpb) barcode data 310, for example, as part of the item attribute data 316. After processing the EPM services request 312, in some aspects, as described above with respect to process flow 200 of FIG. 2, the EPM services component 201 generates an electronic postmark 318. As discussed above, in some aspects, the electronic postmark 318 includes one or more of EPM metadata, transaction data hash, a timestamp, and a digital signature. The generated electronic postmark is then transmitted to the services component 301 in step 6.

The services component 301 may then store the transaction and associated EPM information in a data store 320 in step 7. The DES services component 301 then returns the barcode data 310 to the customer in step 8. The customer may then affix the barcode to a package that is processed by a shipment processing system in step 9.

By storing the item transaction and associated EPM information in a data store, the system 300 may enable reporting capabilities not available with current systems. For example, reports may be provided that show item volumes associated with one or more parameters in the item transaction record 308. Additionally, specialized reports may also be provided regarding parameter EPM metadata, and how particular EPM metadata relates to item types, volumes, and the like.

Figure 4:
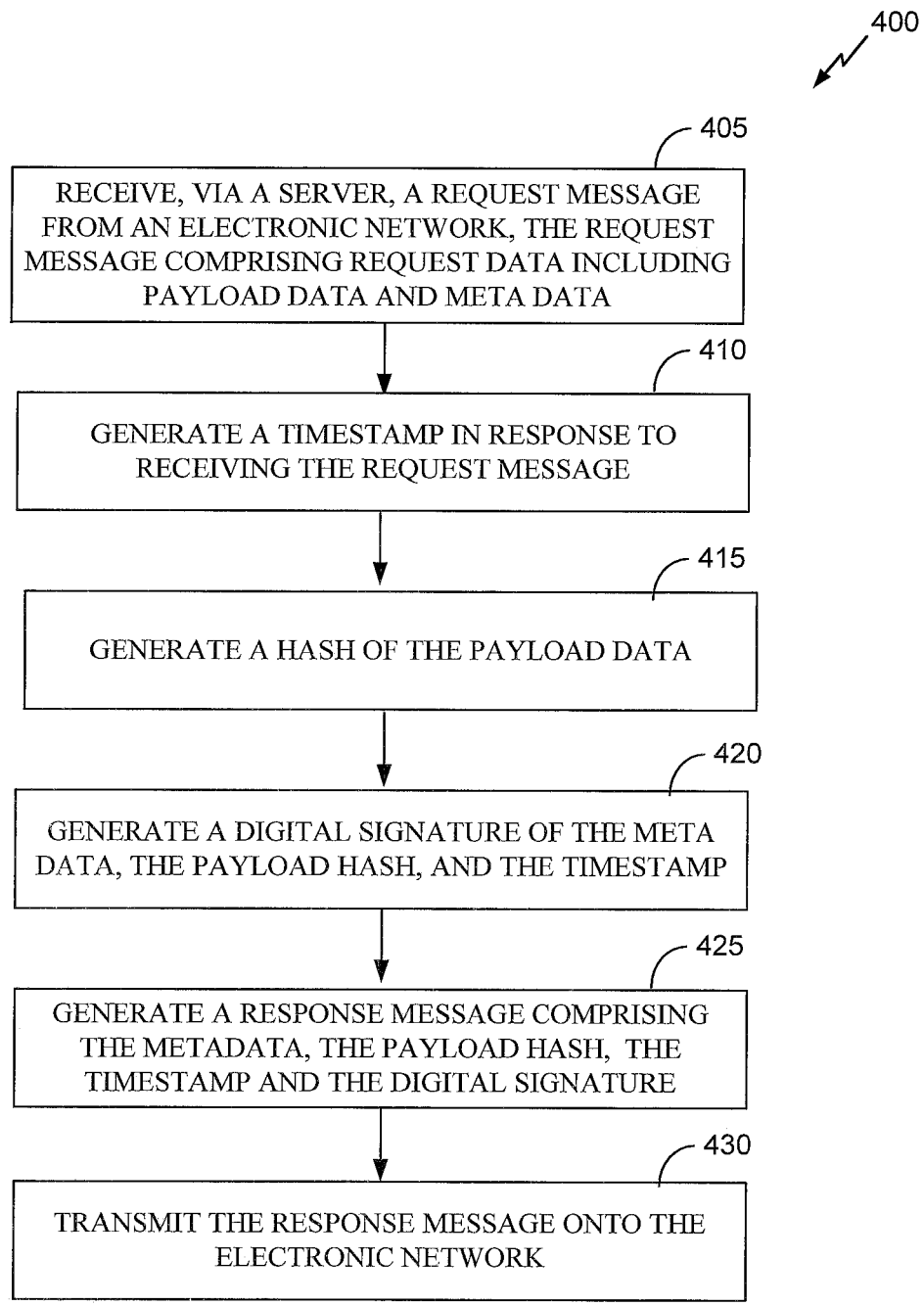
FIG. 4 is a flowchart of a method of generating an electronic postmark.

FIG. 4 is a flowchart of a method of generating an electronic postmark. In some aspects, the method 400 disclosed with respect to FIG. 4 may correspond to the process described with respect to FIG. 2. In some aspects, the method 400 may be performed by the apparatus 500 of FIG. 5.

An entity, such as a package shipping company, may provide customers with an ability to store and/or transmit electronic documents and other forms of electronic data. The electronic data may be sensitive and/or valuable to the end users, such that the customer needs to be able to ensure non-repudiation and authenticity as part of its storage and transmission functionality. In order to ensure non-repudiation and authenticity, an electronic postmark (EPM) may be generated for the electronic data through an approved digital evidencing system (DES). Specific pieces of metadata related to the end user and to the electronic data, as well as a payload of the actual data itself, may be used to generate the electronic post mark. The customer may utilize a service application programming interface (API) that accepts the metadata and electronic payload as inputs in order to generate the electronic postmark. Once inputs are received, the digital evidencing system (DES) may generate a digital hash over the payload data, combine the hash, metadata, and timestamp into an EPM data structure, and then may digitally sign the EPM data structure and store it for audit purposes. The EPM data structure may then be returned to the customer so that the customer can save the EPM to a local file or data store along with the original data and/or transmit both to a $3^{rd}$ party. If the customer submits invalid or insufficient data, the EPM may not be generated and the DES may return an error to the customer.

An electronic postmark is generated to guarantee non-repudiation and authenticity of a set of data. That set of data may be referred to as an electronic postmark payload. The EPM payload may represent almost any block of electronic data that can be expressed as a finite-size array of bytes. EPM payload data may exist in almost any electronic form, including structured text, documents, images, binary executables, and compressed archive files. In some aspects, an electronic postmark (EPM) may be a set of XML structured/formatted data defined in a DES XML schema. The EPM data structure may consist of one or more of the following components: EPM attributes, system audit information, and/or EPM payload metadata.

An electronic postmark may not contain actual EPM payload data, nor does it necessarily provide confidentiality by encrypting EPM payload data. Instead, an EPM exists external to the EPM payload for which it was generated. In order to ensure that an EPM is associated to a correct EPM payload, an EPM customer may store and/or transmit the EPM payload data and EPM in such a way that the relationship between the two is maintained.

In block 405, a request message is received by a server. In some aspects, the request message is in the form of a simple object and access protocol (SOAP) message. In some aspects, the message is a "restful" message, such as an HTTP request message. In some aspects, the reception of the request message is preceded by the opening of a secure session with a device transmitting the request message. The request message is then received over the secure connection.

In some aspects, before processing the message, block 405 determines whether the request message includes a digital signature of the request message. In some cases, the digital signature may be based on a X.509 digital certificate. In some aspects, block 405 verifies whether the message includes a timestamp and/or a security token including a predetermined identifier. In some aspects, block 405 determines whether the request message is encrypted. Various aspects of the method may reject the request message if one or more of these conditions are not satisfied.

The request message includes request data, which includes payload data and metadata. In some aspects, the metadata may be data pertaining to a mail piece. For example, the metadata may define one or more of information relating to an origin of a mail piece, information relating to a recipient of a mail piece, an identifier of a mailer of a mail piece, and an identifier of a provider of the mail piece.

In some other aspects, the metadata may be data pertaining to healthcare information. For example, in these aspects, the metadata may define one or more healthcare attributes as defined in an HL7 message header. For example, the metadata may define one or more of a sending application, sending facility, sending responsible organization, sending network address, receiving application, receiving facility, receiving responsible organization, receiving network address, security information, message type information, message control identification information, a processing identifier, a version identifier, sequence number information, an indication of an acknowledgment type, a country code, an identifier of the language of the message, and a provider identifier.

In some aspects, the payload data may include an email message, healthcare information, or a direct protocol message.

In some aspects, the request message may also include a requestor account identifier or a billing account identifier. These values may be decoded from the request message.

In block 410, a timestamp is generated in response to receiving the request message. In block 415, a hash of the payload data is generated.

In block 420, a digital signature of the metadata, the payload hash, and the timestamp is generated. Some aspects of block 420 may store an association of the metadata, the payload hash, the timestamp, and the digital signature in a data store, such as, for example, in a database that is accessible to one or more reporting engines. The database may be used to generate reports relating to how electronic postmarks are utilized. For example, by using this database, the number of electronic postmarks created by particular customers may be determined. For example, the database may be queried to return records with metadata provider/ user identifiers equivalent to a particular value. In addition, the types of data being postmarked may also be characterized in some aspects.

In block 425, a response message is generated that includes the metadata, the payload hash, the timestamp, and the digital signature. For example, in some aspects, the response message is generated to comprise an electronic postmark that is based on the metadata and payload data provided in the request message. In some aspects, the response message is also digitally signed.

In block 430, the response message is transmitted onto the electronic network. In aspects that digitally sign the response message, the digital signature of the response message is included in the transmission of the response message.

In some aspects, the response message is transmitted to a device that transmitted the request message. In some aspects, the request message of block 430 and the response message of block 430 may comprise a "restful" (such as provided by the hyper-text transfer protocol (HTTP) protocol) or a SOAP protocol exchange.

Figure 5:
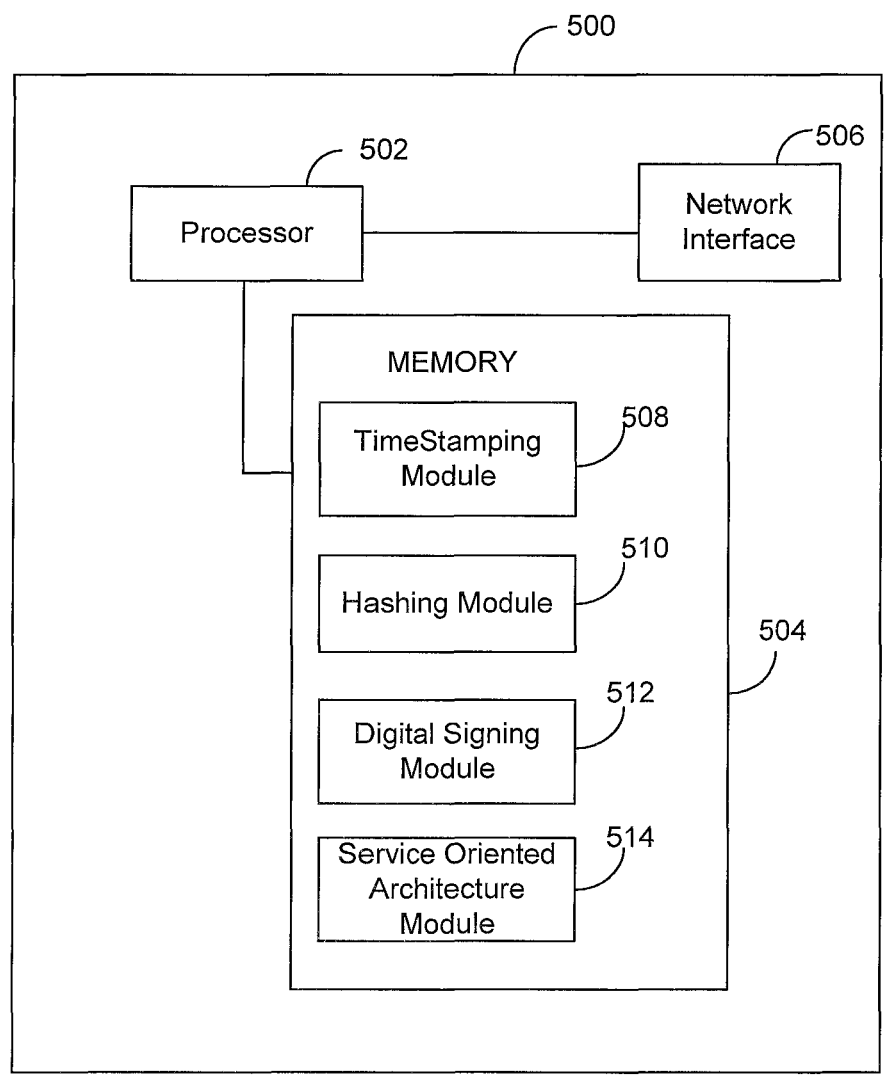
FIG. 5 is a functional block diagram of an apparatus that may be configured to perform one or more of the disclosed embodiments.

FIG. 5 is a functional block diagram of an apparatus that may be configured to perform one or more of the disclosed embodiments. The apparatus 500 includes a processor 502, memory 504 operably connected to the processor, and a network interface 506 that is also operably connected to the processor. The memory stores instructions that configure the processor to perform operations. The instructions stored in the memory are organized into modules. Instructions in the time stamping module 508 may configure the processor to perform one or more of the functions discussed above with respect to block 410 of FIG. 4. A hashing module 510 includes instructions that configure the processor to perform one or more of the functions discussed with respect to block 415 of FIG. 4. A digital signing module 512 includes instructions that configure the processor to perform one or more of the functions discussed above with respect to block 420. A service oriented architecture module 514 includes instructions that configure the processor to perform one or more of the functions discussed above with respect to block 405 and/or 425 and/or 430.

Figure 6:
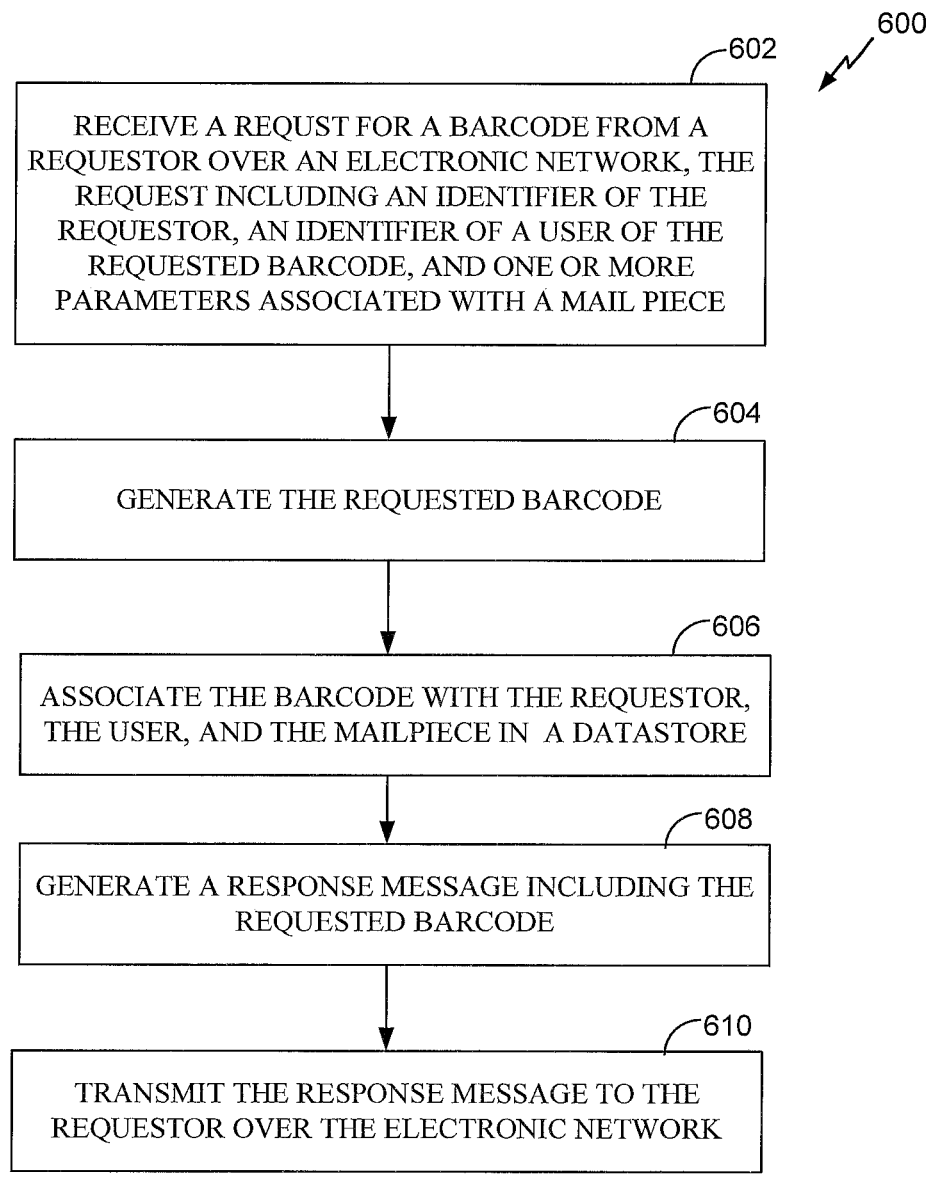
FIG. 6 is a flowchart of a method of providing a barcode for a mail piece.

FIG. 6 is a flowchart of the method of providing a barcode for a mail piece. In some aspects, the method 600 described with respect to FIG. 6 may correspond to the process discussed above with respect to FIG. 3. In some aspects, the method 600 may be performed by the apparatus 700 disclosed below with respect to FIG. 7. A digital evidencing system (DES) may provide means to digitally sign and timestamp various types of electronic data. In some cases, an implementer of a DES may be trusted within the community it operates, thus instilling a level of confidence in the protection provided. The process of digitally signing and time stamping electronic data through a DES results in the creation of an Electronic Postmark (EPM). While many forms of secure communication provide security for electronic data in transit, the EPM provides authenticity, data integrity, and non-repudiation for electronic data in transit and at rest. This allows the data to be stored and/or transmitted with assurance of integrity and a verifiable audit trail.

An EPM can generally be applied to most forms of electronic data. However, in addition to an EPM, a digital evidencing system may also provide specialized mail piece services to generate Intelligent Mail Package Barcode (IMpb) data for use in the creation of postage labels. Each IMpb transaction includes the generation of IMpb data as well as an associated EPM, which can be used to verify the integrity and authenticity of mail pieces throughout the delivery process. IMpb data is returned to the mail piece service client while the corresponding EPM is used to process postage through a mail system.

In some cases, a customer may provide an end user with an ability to create and print postage labels online. The customer may need to generate an intelligent mail package barcode (IMpb) as part of the process for creating a postage label. The IMpb may be generated through an approved DES to ensure uniqueness of the barcode value and also to create an associated EPM. Specific pieces of data related to the mail piece, or mail piece attributes, may be needed to generate the IMpb and EPM. The customer can utilize a DES service API that accepts these mail piece attributes as inputs to generate the IMpb. Once inputs are received, the DES digitally signs the data and generates an associated EPM, which is then stored in the DES database for internal use. The DES then returns a valid IMpb to the customer. If the customer submits invalid or insufficient data, neither the IMpb nor the EPM are generated and the DES returns an error to the customer.

In block 602, a request is received for a barcode from a requestor over an electronic network. The request may be received in various forms, including, for example, as a "restful" message such as a hypertext transfer protocol (HTTP) message or as a service oriented application protocol (SOAP) message. The requestor may be a registrant of a security account under which the request is received. For example, the request may be received within a secure session that is initiated based on authentication credentials of a registrant. The request also includes a user/provider of the requested barcode. In some cases, the user/provider of the requested barcode is the requestor. In some other aspects, the user is distinct from the requestor. For example, in some aspects, an account registrant may be able to associate one or more users with the account. The user identified in the message may be one of the associated users.

The request also includes one or more parameters associated with a mail piece. Each of these parameters may be decoded from the request message. These parameters can include information relating to a creation date of the mail piece, mailing date of the mail piece, mail class of the mail piece, an identifier of a price table for the mail piece, a postage type ("C" or "P" for example), an identifier of a contract number for shipping services, an identifier of a product for a shipping services contract, a rate indicator (e.g. "01"), an indication of whether a signature waiver is recorded for the mail piece, an indication of a delivery option for the mail piece, information specific to the person or organization printing the postage label and sending the mail piece, a return address of the mail piece, a destination of the mail piece, a list of extra services applied to and paid for as part of the mail piece postage. In some aspects, one extra service element may be present for each extra service applied to the mail piece postage, a postage value of the mail piece, an evidence type indicator, an indication of the mail piece weight, dimension information, international shipping information. An intelligent mail package barcode specification including data structures and requirements for each of the IMpb formats was published by the United States Postal Service on Dec. 29, 2011. The specification is revision E, and carries the USPS number 2000508, and cage code 27085. This specification is hereby incorporated by reference in its entirety.

The parameters may also include sender related information, such as names, contact information, whether the sender is qualified to ship hazardous materials, return address information. The parameters may also include destination related information, such as names and contact information. The parameters may also include postage information, such as fee information, postage value information, evidence type information, weight information, dimension information, international shipping information, and intelligent mail package barcode information.

In block 604, the requested barcode is generated. In some aspects, the requested barcode is generated to contain one or more particular components. For example, in some aspects, ten digits of the requested barcode are generated to create a ten digit intelligent mail package barcode (IMpb). In some aspects, the request barcode is generated to be twenty digits in length, with ten of those digits formed by the IMpb. In some aspects, a portion of the generated barcode may identify a computer system that is generating the barcode. For example, the generated barcode may include a server instance identifier. In some aspects, a digital evidencing system that generates barcodes may be hosted by and maintained within the United States Postal Service organization. However, even within one installation, there may be multiple server instances implementing barcode generation capabilities, or, in other words, an ability to perform method 600. Additionally, some implementations may run on servers maintained/hosted by other organization, such as partner or customer organizations. These various systems that implement process 600 may be provided with unique identifiers. These unique identifiers or server instance identifiers may be indicated in the barcodes generated by those respective systems. Such a design may provide forensics capabilities after the barcode is generated. For example, with this design, it may be possible to derive which server or digital evidencing system installation generated a particular barcode, by examining the barcode and decoding the server instance identifier.

In some aspects, the barcode may be generated to include a serial number. For example, when a system implementing process 600 is first installed or otherwise initialized, a serial number may be set to an initial value, such as zero (0). Each time a barcode is generated by the system running process 600, the serial number may be incremented. This serial number may then be indicated in the generated barcode. In some aspects, the barcode may also indicate a provider and/or user identifier.

In some aspects, block 604 may also include generating an electronic postmark based on the request message. The electronic postmark may be further based on the generated barcode in some aspects. For example, the generated barcode may be at least part of the data for which the EPM is generated. In some aspects, the method 400 may be used to generate the electronic postmark. In some aspects, the functions discussed above with respect to block 604 may be performed by instructions included in the In block 606, the generated barcode is associated with the requestor, the user and the mail piece parameters in a data store. In aspects that generate an electronic postmark as described above, the electronic postmark may also be associated with the barcode and the requestor, user, and mail piece parameters in the data store. By associating the barcode with the mail piece parameters, requestor, and user in a data store, the disclosed methods and systems enables powerful reporting capabilities relating to barcodes and mail pieces. For example, with this data store, reports identifying the types of mail pieces processed by particular users and/or requestors can be generated.

In block 608, a response message is generated that includes the requested barcode. In some aspects, the response message may include an electronic postmark generated (optionally) in block 606.

In block 610, the response is transmitted to the requestor over the electronic network.

Figure 7:
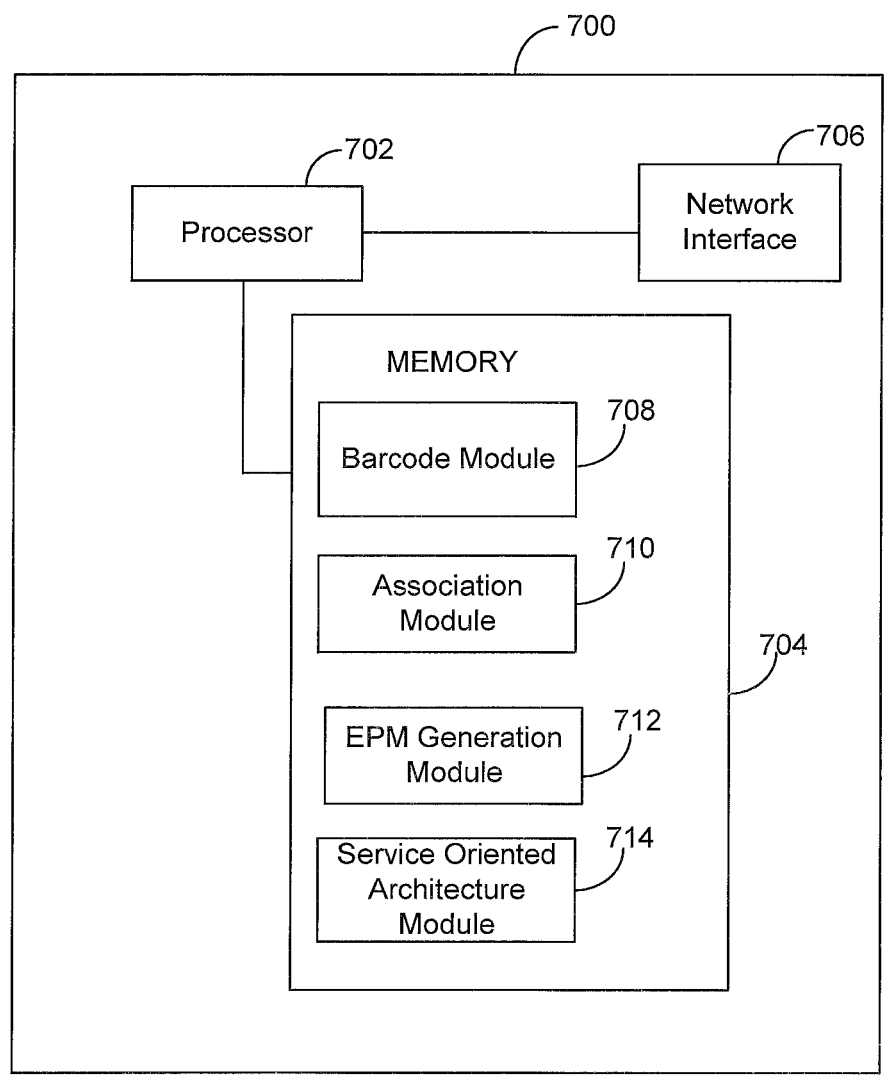
FIG. 7 is a functional block diagram of an apparatus that may be configured to perform one or more of the disclosed embodiments.

FIG. 7 is a functional block diagram of an apparatus that may be configured to perform one or more of the disclosed embodiments. In some aspects, the apparatus 700 may be integrated with the apparatus 500 disclosed with respect to FIG. 5. The apparatus 700 includes a processor 702, memory 704 operably connected to the processor, and a network interface 706 that is also operably connected to the processor. The memory 704 stores instructions that configure the processor to perform operations. The instructions stored in the memory 704 are organized into modules. Instructions in the barcode module 708 may configure the processor to perform one or more of the functions discussed above with respect to block 604 of FIG. 6. An association module 710 includes instructions that configure the processor to perform one or more of the functions discussed with respect to block 606 of FIG. 6. An EPM generation module 712 includes instructions that configure the processor to perform one or more of the EPM generation functions discussed above with respect to block 606 of FIG. 6. A service oriented architecture module 714 includes instructions that configure the processor to perform one or more of the functions discussed above with respect to block 602 and/or 608 and/or 610.

Figure 8:
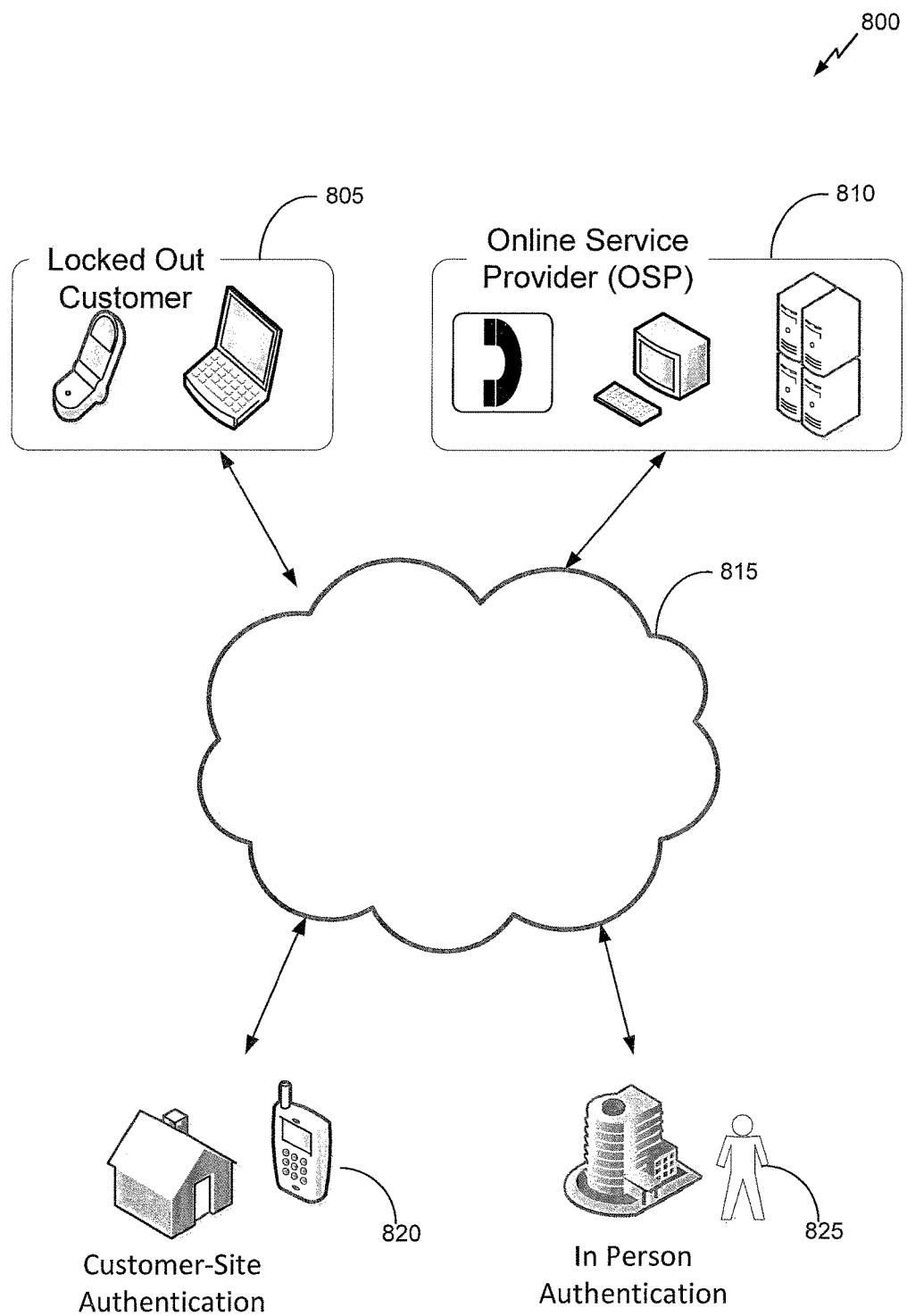
FIG. 8 is an overview of a digital credential reset (DCR) process.

FIG. 8 is an overview of a digital credential reset (DCR) process. Digital credentials are used by a wide variety of computer based systems to authenticate a particular user's access to the system. The most common digital credential is the password. Current password reset procedures generally rely on the security of an individual's email account to provide for resetting of the password. For example, when a user of a computer system needs to reset their password, an email message is often sent to the account on file for the user. The user can then click on a link to reset the password and enter a new one.

However, this process has a number of vulnerabilities. First, in such a system, a complete login is not required in order to reset the password. Therefore, a malicious actor that perhaps only knows the user's name can request the user's account password be reset, generally without any prior authorization. When the legitimate user then attempts to access their account after the illegitimate password reset, they would be unable to do so. While the user could likely resolve the issue after some period of time, they are none the less inconvenienced by this attack. In the event that urgent access to their account was needed, this exploit could prevent legitimate access to the account at a critical moment, perhaps resulting in substantial consequences in some cases.

Another problem with the above mentioned approach is that it relies on the security of the user's email system. This reliance makes the system vulnerable in at least three ways; 1) it relies on the user's legitimate address being stored on the system to be reset. This vulnerability may be exploited, for example, by an insider, such as an employee at the customer service center. The employee might alter the email address on file to some other email address that is used for nefarious purposes. When the password reset email is sent to this nefarious email account, the account may be hijacked, as the attacker can chose a password to their own liking; 2) The traditional approach to password reset also assumes that only the legitimate user has access to the email account to which the reset email is sent. To the extent the user's email account is compromised, sending a password reset email to the email account, as is commonly done with today's designs, can expose the account to exploitation. For example, once a nefarious user has access to the password reset email, they can select a password for the account of their own choosing; and 3) it assumes that the password reset email cannot be intercepted on the network as it travels from its source to the user's email account. To the extent the email travels over a public network, such as the Internet, and is not encrypted with end to end authentication, which most emails are not, the email is subject to exploitation during its trip between its source and the user email account.

The digital credential reset process shown in FIG. 8 improves security by dividing the digital credential reset process into two distinct portions. Additionally, the reset process shown in FIG. 8 does not rely on transmission of an email message over a public network to the user's email account, thus improving the security of the digital credential reset process.

When a customer 805 needs to have their digital credentials reset, for example because they are locked out of their account, they may first contact a customer service center 810. Communication between the customer 805 and the customer service center 810 may be provided in some aspects, by a computer network 815, such as the Internet. The locked out customer 805 may provide at least a portion of the information needed to validate their identity to the customer service center 810, and ultimately provide the confidence level necessary for the digital credential reset process to proceed to a second phase.

In the process described by FIG. 8, only a portion of the data necessary to complete the validation of the user's identity is provided by the locked out customer 805 to the customer service center 810. Notably, part of the exchange of information between the customer 805 and customer service center 810 is to establish a location for a second and necessary portion of the validation to occur. For example, while the first portion may occur over the phone, a second portion of the validation must occur "in person." In other words, the individual requesting the digital credential reset must either travel to a particular location 820, on in some aspects, a representative may be sent to the location of the individual, as shown by the in-person authentication 825 of FIG. 8. The location for the second portion of the validation may be established during the first portion of the validation process.

By dividing the validation of the individual's identity into two portions, a first portion to be performed remotely, for example, in some aspects, over the telephone, and a second portion of the validation to be performed "in person," the risk associated with the digital credential reset is reduced.

Figure 9:
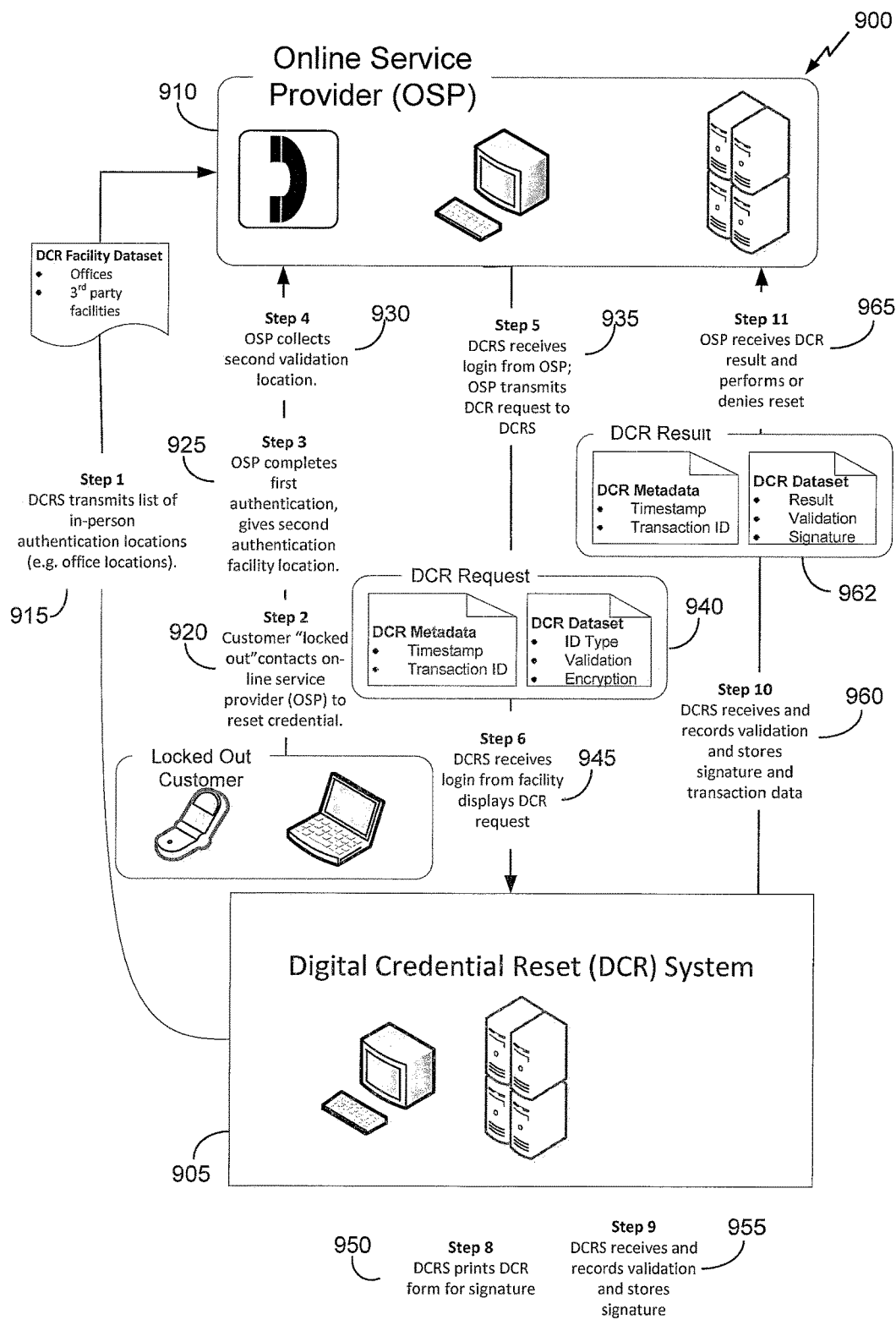
FIG. 9 is a flowchart of a more detailed view of a proposed digital credential reset process.

FIG. 9 is a more detailed view of a proposed digital credential reset process. FIG. 9 shows a digital credential reset system 905 and an online service provider 910. In step 1 915, the digital credential reset system (DCRS) 905 transmits a list of in-person authentication locations (e.g. office locations) to the online service provider 910. In step 2 920, a customer that is locked-out of their account contacts the online service provider 910. In step 3 925, the online service provider completes a first portion of the authentication operation, and provides the customer with a list of possible second authentication facilities. In some cases, the facilities provided may be locations not related to the customer. For example, a store or office in a commercial area may be one or more of the locations. In some aspects, locations relevant to the customer may be provided as choices. For example, in some aspects, the online service provider may be able to send a representative to a physical location of the customer, such as to their place of residence or employment, in order to perform a second portion of the validation.

In step 4 930, the online service provider collects the selected location for the second portion of the authentication from the customer. In step 5 935, the digital credential reset system (DCRS) receives a login from the online service provider, and then receives, via the session associated with the login, a digital credential reset (DCR) request for the digital credential reset system (DCRS). The digital credential reset request 940 may include at least two types of data. First, DCR metadata is included, which may comprise at least a timestamp and a transaction identifier (ID). The DCR request 940 may also include a digital credential reset (DCR) dataset, including an identification type, validation information, and encryption information. In step 6 945, the digital credential reset system receives a login from the online service provider facility and displays the digital credential reset request.

In optional step 8 950 (step 7 omitted), the digital credential reset system (DCRS) prints a digital credential reset form for signature. The form may include information regarding validation of the second portion of the user's credentials. The form may also include signature lines for the user themselves and one or more representatives of the entity maintaining the location for the second portion of the validation. For example, an employee or representative performing the second portion of the validation may be required to sign the form in some aspects.

Between step 8 and step 9 (not shown), an "in-person" validation occurs. In step 9 955, the digital credential reset system receives and records validation information and stores the signature of the customer. In step 10 960, the digital credential reset system receives and records validation and stores signature and transaction data. In step 11 965, the online service provider receives a digital credential reset result 962 from the digital credential reset (DCR) system. The DCR result 962 may include at least DCR metadata and a DCR dataset, as described above with respect to DCR Request 940. In step 11 965, the online service provider receives the DCR result 962 and performs or denies the reset request of the digital credentials based on the result.

Figure 10:
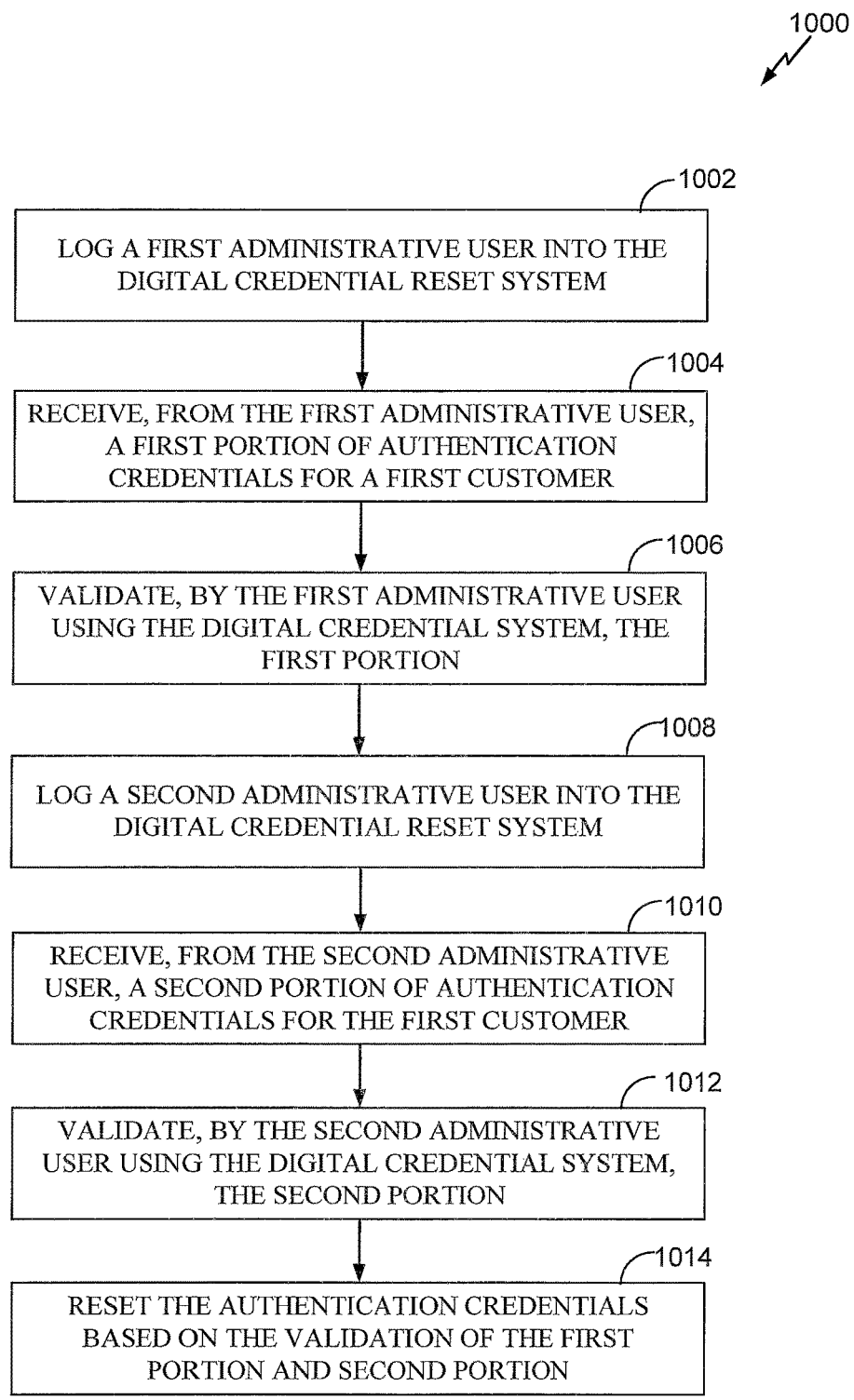
FIG. 10 is a flowchart of a method of resetting a digital credential.

FIG. 10 is a flowchart of a method of improving the security of a digital credential based computer system. Method 1000 provides a more secure method of resetting a digital credential than known techniques. As discussed above, known techniques are subject to a number of vulnerabilities, including denial of service attacks which cause a reset of credentials and denial of use of resources protected by the digital credential. These techniques are also vulnerable to infiltration of a user's email system, which is often used to facilitate the exchange of messages necessary to accomplish a reset of digital credentials.

By dividing the validation of credentials into two separate portions, security is improved via the disclosed methods and systems. At least one portion of the validation must occur at a physical location indicated by the customer. Moreover, in some aspects, this validation includes a human operator, who is able to meet the individual requesting the digital credential reset and who is presenting information (documents or physical information from their person). This human operator may be in a position to judge the credibility of the individual present at the location, using all of the intangible elements possible when interacting with an individual face to face.

Furthermore, the human operator may be trustworthy by some measures. For example, the human operator may be a government employee. In some aspects, the human operator may have passed one or more screening steps to increase their trustworthiness. For example, the human operator may have passed a background check, security screening, and/or may be bonded in some aspects. In some aspects, the physical location indicated by the customer is also a trusted location. For example, the location may be a government facility, such as a post office in some aspects. The fact that this portion of the validation occurs at the trusted facility, in some aspects, increases the security of the reset process. In some aspects, the physical location may be constrained geographically. For example, in some aspects, the physical location must be within a threshold distance of an address indicated in the user account that is being reset. For example, if the user's account address is in New York, the in person verification cannot occur in California, or China for example. In some aspects, the location must be within 1, 2, 3, 4, 5, 10 or 25 miles of the user account address. This limitation alone can work to prevent a vast majority of fraudulent reset attempts, which may typically be initiated at a location far from the user whose account is the subject of the fraud.

Figure 11:
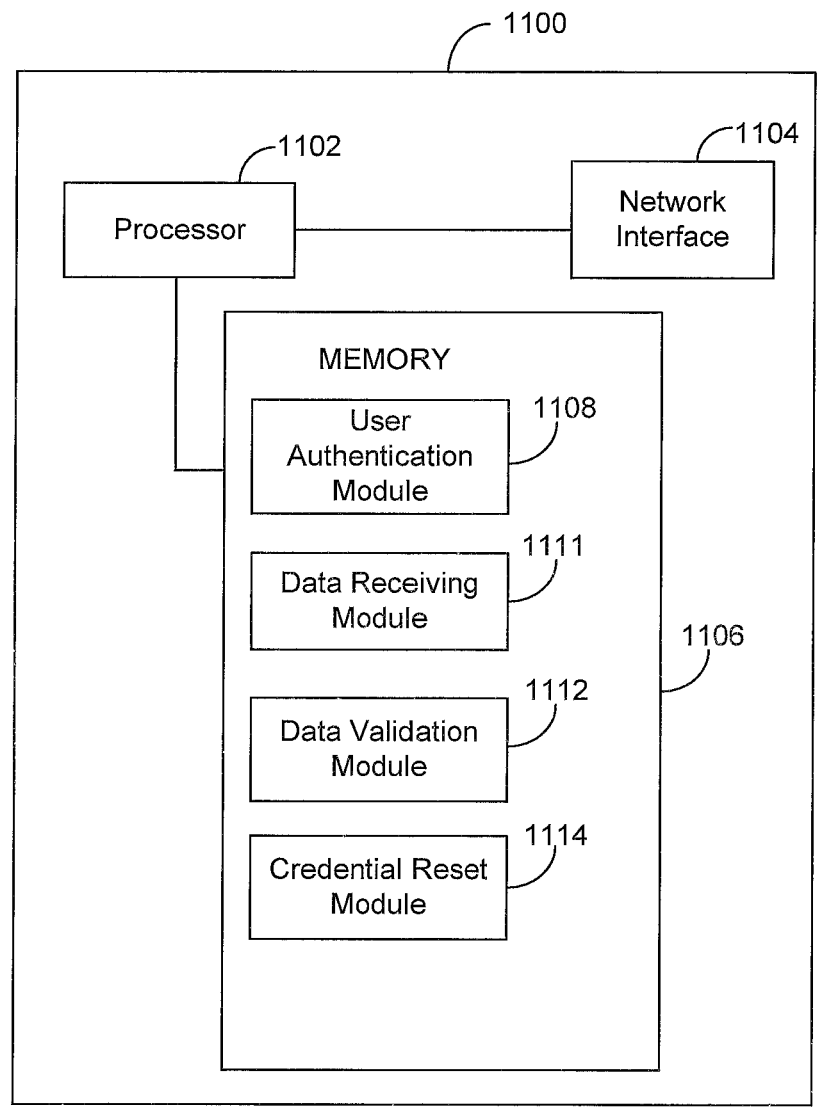
FIG. 11 is a functional block diagram of an apparatus that may be configured to perform one or more of the disclosed embodiments.

In some aspects, the method 1000 of FIG. 10 may be performed by the device 1100 of FIG. 11.

In block 1002, a first administrative user logs into the digital credential system. Logging the first administrative user into the DCRS may include comparing one or more of a user name and/or password provided by the user to corresponding records within the DCR for the first administrative user. If the comparison matches, the user may be considered logged in, otherwise, the login attempt may be rejected. The administrative user may have particular security credentials for the DCR system, allowing the first administrator user to, for example, validate a portion of a user's authentication (as described below with respect to block 1006). In some aspects, the system may prohibit this portion of validation to be performed by a non-administrative user.

In some aspects, block 1002 may include receiving identification information for a terminal used by the first administrative user to login. The identification information for the terminal may be compared to a separate data store that identifies locations of a plurality of terminals. By comparing the received identification information to the database, process 1000 may determine a location of the first administrative user when they logged in. This information may be used, for example, to require a different location be selected for validation of a second portion of authentication credentials, discussed further below.

In some aspects of block 1002, the login is performed by the customer themselves and not by an administrative user. For example, at least two aspects are contemplated by process 1000. In a first aspect, the first administrative user interacts with the customer via telephone, web chat, or other communications medium to collect the first portion of authentication credentials from the customer. In this aspect, the customer may not have a login to the DCRS. Instead, only the administrative user may have a login. In a second aspect, the customer does have a login to the DCRS. The customer may have a different set of access privileges than an administrative user, such as the first and second administrative users discussed with respect to process 1000. The customer's login capability may allow them to request a reset of their digital credential, and to enter a first portion of authentication credentials (as discussed below). This embodiment avoids the need for the customer to interface with the first administrative user, potentially lowering costs when compared to aspects that utilize the first administrative user.

In block 1004, a first portion of authentication credentials for a first customer is received from the first administrative user. Receiving the first portion may include receiving a message over an http or https connection with a remote program, such as a browser. The message may be parsed to decode the first portion of the authentication credentials. For example, once the first administrative user is logged into the system, they may participate in a conversation, over a telephone, chat system, or other means of communication, where they collect a variety of authentication information from a user. This may include authentication information such as the user's name, date of birth, email address, answers to secret questions, mother's maiden name, address, or other details. The first administrative user may then enter the information they obtain into the DCR system, thus, the system may receive the first portion of authentication credentials in this manner.

Other information may be collected as well. For example, location information indicating a location (where) the user would like to validate a second portion of authentication credentials may be received. In some aspects, this may be indicated as an office location, a postal address, or by geographic coordinates of the location. In some aspects, the location may be a home address of the user. For example, in some aspects, an administrative entity of the DCRS may employ individuals who may visit the home address of the user to collect the second portion of the authentication discussed below. The employed individual may be the second administrative user discussed below in some aspects.

This location information may be stored in a database for later use. For example, when the user goes to the indicated location, they may present verification of their identity via various documents, such as a driver's license, birth certificate, passport, military identification card, or other identity documents. This is discussed further below.

In aspects where the customer themselves logs into the system in block 1002, the first portion of authentication credentials is received from the first customer (via their login session), and not from an administrative user.

In block 1006, the first portion received in block 1004 is validated. Validation may include comparing at least some of the information received in block 1004 to corresponding records stored in a database within the digital credential system. The records may be associated with a user account (the customer's account) that is the subject of the digital credential reset operation. If the compared information matches that stored in the database, the validation may be successful, whereas if at least some subset of the portion does not match, the validation may be unsuccessful in some aspects. In some aspects, the performance of blocks of method 1000 described below is conditional on a successful validation in block 1006. If the received information is not validated, the digital reset process is essentially complete, with no reset of the digital credential being performed, as both the first portion and second portion of the authentication credentials must be successfully validated for the reset of the digital credential to be performed.

In block 1008, a second administrative user logs into the digital credential reset system. Logging the second administrative user into the digital credential reset system may include, as discussed above with respect to the first administrative user, comparing one or more of a user name and password entered by the second administrative user to records for the second administrative user's account within the DCRS. If the comparison matches, the second administrative user may be logged in, otherwise, they may not be logged in.

In some aspects, block 1008 may determine a location of the second administrative user. For example, in some aspects, a terminal utilized by the second administrative user may transmit location information indicating its location to the DCRS. This second administrative user terminal location information may be compared to the location information provided by the user. If the second administrative user's terminal location is not within a threshold distance of the location indicated by the user, the second administrative user may be prevented from performing the validation of the second portion.

The second administrative user may be at a different location from the first administrative user. For example, while the first administrative user may be located at an online service provider, such as the online service provider 910 shown in FIG. 9, the second administrative user may be at a different location, and under the control of a different entity. For example, the second administrative user may be located at an office location that is equipped to perform "in person" authentications. Alternatively, the second administrative user may log in via a mobile device, and may be physically located at a geographic location associated with the customer, such as the customer's residence or place of employment.

Block 1008 may verify that the location of the second administrative user is appropriate for performing validation of the second portion of the authentication credentials. For example, if the location information collected from the user in block 1002 is not equivalent, or not within a threshold distance of the location information indicated by the second administrative user's terminal, the second administrative user may be prevented from performing any portion of process 1000, or may be prevented from entering the second portion of the authentication credentials for the first customer as discussed below.

In block 1010, a second portion of authentication credentials for the first customer is received from the second administrative user. Receiving the second portion in block 1010 may include receiving data entry provided by the second administrative user via, for example, a web browser. The receiving may include receiving a message from a network and parsing the message to identify the second portion.

In some aspects, the second portion of authentication credentials may be information that is only obtainable from the customer themselves, for example, from the physicality of the customer, or from an official identification of the customer. For instance, the second portion may include one or more pieces of biometric information, such as a digital representation of a fingerprint, retinal scan, blood sample, or other biometric information relating to the individual. Alternatively, the second portion may include information such as a driver's license or other government issued identification number, driver's license issue date, passport issue date or expiration date or passport number. In some aspects, the second portion may include a digital representation of a signature of the customer. For example, the signature may be collected during the "in person" visit. In some aspects, the information received may be checksums or other validating information for scanned pictures of one or more identifying documents. For example, in some aspects, the second administrative user may scan one or more of the user's driver's license, passport, government identification (such as a military identification), birth certificate, or other identifying document. Hashing or other algorithms may then be run on the scanned images to produce a signature (i.e. identifying binary number). The signature may be included as part of the second portion of the authentication credentials.

In block 1012, the second portion is validated by the digital credential reset system. In some aspects, validation of the second portion may include comparing one or more data items included in the second portion to corresponding records stored within the digital credential system. If the data received matches the corresponding data stored in the digital credential system, the second portion of the validation may be successful, otherwise it may not be considered successful. Additionally, if particular data is missing in the second portion, the validation may be considered unsuccessful. In some aspects, block 1012 includes preventing validation of the second portion by the first administrative user, since the first administrative user validated the first portion. Additionally, the first administrative user may not be at the validation location. In some aspects, entry of a location for validation of the second portion in block within a second threshold distance from the first administrative user In block 1014, the authentication credentials may be reset based on the validation of the first and second portion. For example, if both the first and second portions of the credentials were successfully validated, then the reset of the credentials may proceed, otherwise, the credentials may not be reset.

Resetting credentials may include initializing one or more of the credentials, such as a password. Resetting may also include prompting the customer for a new credential, such as a password, and then setting the password to the value provided by the customer. In some aspects, resetting credentials may include selecting a new user name for the user. In some aspects, resetting credentials may include assigning a new digital security id to the user. The digital security id may display a random number sequence that, when distributed to the user, is entered by the user during an authentication process. Because only the system also known what the random number sequence is at any point in time (such as when the user logs in), this increases the security of the user's account. In some aspects, a digital security id may run out of batteries or may be lost by the user, necessitating an assignment of a new digital security id to the user/account. However, this reassignment presents a security vulnerability, if the digital security id is provided to an imposter. Thus, the assignment of a new digital security id can be made more secure through the methods and systems disclosed herein.

FIG. 11 is a functional block diagram of an apparatus that may be configured to perform one or more of the disclosed embodiments. The apparatus 1100 includes a processor 1102, memory 1104 operably connected to the processor, and a network interface 1106 that is also operably connected to the processor. The memory stores instructions that configure the processor to perform operations. The instructions stored in the memory are organized into modules. Instructions in the user authentication module 1108 may configure the processor to perform one or more of the functions discussed above with respect to blocks 1002 and/or 1008 of FIG. 10. A data receiving module 1104 includes instructions that configure the processor to perform one or more of the functions discussed with respect to blocks 1004 and/or 1010 of FIG. 10. In some aspects, means for receiving may include the instructions in the data receiving module 1004, along with the processor 1002 and memory 1104. A data validation module 1112 includes instructions that configure the processor to perform one or more of the functions discussed above with respect to blocks 1006 and/or 1012. A credential reset module 1114 includes instructions that configure the processor to perform one or more of the functions discussed above with respect to block 1014.

Figure 12:
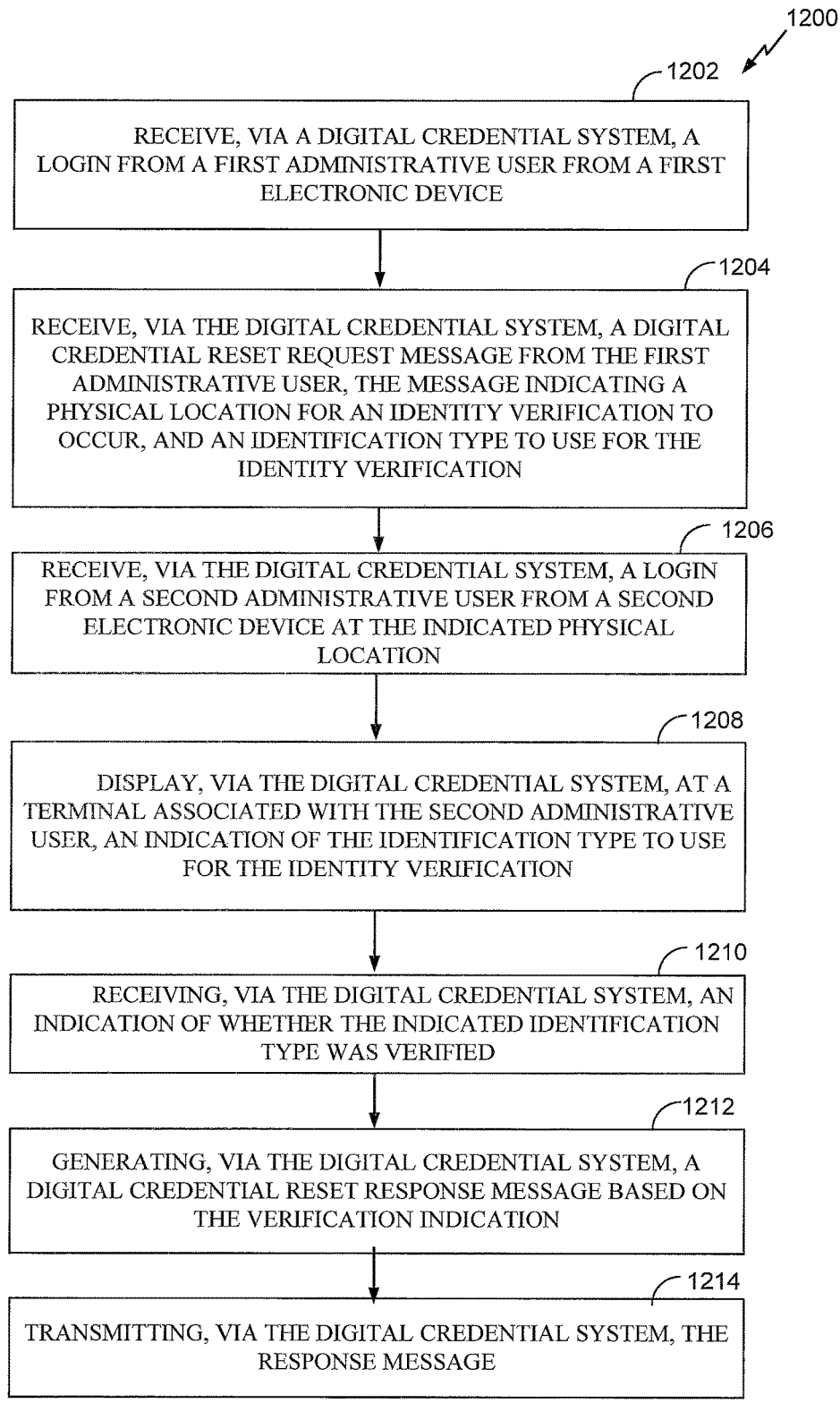
FIG. 12 is a flowchart of a method of performing a digital credential reset.

FIG. 12 is a flowchart of a method of performing a digital credential reset. In some aspects, the method 1200 may be performed by the device 1300, discussed below. In some aspects, the method 1200 may be performed by the digital credential reset (DCR) system discussed above with respect to FIG. 9.

As described above, digital credentials are utilized to access a wide variety of resources. These include electronic resources such as storage and email accounts. These resources may also include financial resources, by providing access to financial accounts, including the power to transfer money into and out of the accessible accounts.

However, over the past several years, information typically used to identify an individual has been increasing compromised through a series of electronic hacks of various electronic service providers. As a result, information such as social security numbers, dates of births, addresses, mother's maiden names, and answers to numerous challenge questions have been placed essentially in the public domain. This compromised information makes it increasing difficult to validate an individual's identify purely via electronic means. Furthermore, utilizing known purely electronic means of resetting digital credentials, customers have little recourse other than phone calls, and agents handling such calls may be forced to make difficult choices. For example, do they risk resetting an account under fraudulent pretexts? Or do they risk alienating a customer by denying a legitimate request to reset their account? The disclosed methods and systems improve reduce the need for such false choices. Instead, by providing a solution that utilizes, in part, an in-person verification, the probability of electronic account hacking is greatly reduced. Furthermore, the customer benefits from improved security over their account.

In block 1202, a login is received from a first administrative user. Logging the first administrative user into the DCRS may include comparing one or more of a user name and/or password provided by the user to corresponding records within the DCR for the first administrative user. If the comparison matches, the user may be considered logged in, otherwise, the login attempt may be rejected. The first administrative user logs into the digital credential system from a first electronic device. As discussed above with respect to FIG. 9, in step 5, the digital credential reset system receives a login from an online service provider 910.

In block 1204, a digital credential reset request message is received from the first administrative user by the digital credential system. Receiving the message may include reading data from a network connection, such as a TCP connection. The data may be parsed to identify the message. The request message may be decoded to identify an indication of a physical location for an identity verification to occur, and an identification type to use for the identity verification. As discussed above with respect to FIG. 9, in some aspects, the DCR request may include metadata. The metadata may include one or more of a timestamp and transaction identifier. The request message may also include one or more of validation and/or encryption information.

In block 1206, a login from a second administrative user is received by the digital credential reset system. Logging the second administrative user into the digital credential reset system may include, as discussed above with respect to the first administrative user, comparing one or more of a user name and password entered by the second administrative user to records for the second administrative user's account within the DCRS. If the comparison matches, the second administrative user may be logged in, otherwise, they may not be logged in.

The second administrative user logs into the DCR system from a second electronic device located at the indicated physical location. As discussed above with respect to FIG. 9, the method 1200 may support a DCR process that consists of two portions. A first portion of an identity verification associated with a DCR may be completed, in some aspects, by one online service provider, such as the online service provider 910. The online service provider 910 may then request a second portion of the identity verification to be performed at a particular location, as indicated in the DCR request message. In some aspects, the second administrative user then logs in to the DCR system at block 1206 when they are located at the facility chosen for the second portion of the identify verification. The second administrative user may utilize the DCR system to facilitate the second portion of the verification, as described further below.

The indicated physical location may be a location or facility with a high degree of trust. For example, the location may be a government facility run by employees who have undergone extensive screening to validate their trustworthiness. For example, the employees may have passed background checks and/or security clearances. In some aspects, the employees may be bonded to further enhance their trustworthiness. The trustworthiness of the location may also stem from the fact that it is a physical location. In some aspects, the selected physical location must be within a threshold distance of an address of the user. The address may be part of the user's account record. In some aspects, the system may limit the selection of a location to only those locations within the threshold distance. Thus, for example, a user located in New York cannot perform the second portion of the identify verification in California.

In block 1208, an identification type to use for the identity verification is displayed on a terminal associated with the second administrative user. In other words, the DCR system may prompt the second administrative user to require a particular form of identification by an individual that is present at the indicated physical location. In some aspects, displaying a prompt on a terminal may include generating data defining the prompt and writing the data defining the prompt to a device driver for the terminal, or alternatively in some aspects, generating and transmitting a network message defining the prompt to a web browser running at the terminal. In some aspects, the prompt may be provided on a terminal located at a fixed office location, for example, in some aspects, a post office. The user being verified may have traveled to the fixed office location to facilitate the verification. In some aspects, a photograph associated with the user may also be displayed on the terminal associated with the second administrative user. For example, the user's account may include a photograph of the user. When the user goes to the location for the in-person verification, the photograph of the user may be displayed to assist a worker performing the validation to validate that the person that is physically at the location for the in-person verification resembles the individual in the photograph.

In some aspects, the prompt may be provided on a mobile terminal. For example, in some aspects, a representative of an organization performing the second portion of the verification may travel to a location associated with the individual being verified (and performing the digital credential reset). For example, in some aspects, a mail carrier may travel to an individual's residence or place of employment to perform an in-person verification to facilitate the digital credential reset.

In some aspects, the system performing process 1200 may validate that the second administrative user is at the indicated physical location. For example, in some aspects, location information, such as geographic coordinates, may be received from the second electronic device. This location information may indicate the location of the second electronic device. This information may be compared to the physical location for an identity verification received in block 1204. If they are equivalent, process 1200 may allow the variation of the verification of block 1208-1210 to proceed. In some aspects, multiple methods of validating that the second administrative user is at the indicated physical location may be utilized. For example, in some aspects, the second electronic device may transmit location information, which may be used to validate the location of the second administrative user. In some aspects, an IP address utilized by the second administrative user may also be compared to reference information relating IP addresses to locations. For example, this capability is available from a number of vendors as of the time of this writing, including, for example, www.ip2location.com.

In block 1210, an indication of whether the indicated identification type was verified is received. For example, in some aspects, a representative of an entity performing a second portion of the verification (process 1200) may perform an in person verification of the identification. The user associated with the account being reset may present an identification, such as a government issued ID, or a fingerprint, retinal scan, or other biometric data to the second administrative user. The second administrative user may then enter data into the DCR system based on the in person verification. For example, if the second administrative user is manually verifying the presentation of a government issued identification, the second administrative user may enter data into the DCR system as to whether the identification was successfully verified. Thus, receiving an indication of whether the indicated ID type was verified may include receiving and parsing/decoding a network message, such as an HTTP or HTTPS message in some aspects, to determine the indication. The determined indication may then be stored in a data store in some aspects.

In other aspects of block 1210, the indication of whether the identification type was verified is received electronically. For example, in some aspects, the customer may visit a verification location that includes one or more of a fingerprint scanner or retinal scanner. A scan of the customer's finger and/or retina (for example) may be performed by the scanner(s), with the information electronically provided to the DCR system, without any direct input from the second administrative user. In some aspects, the fingerprint and/or retinal scanner may be portable, such that the second administrative user may visit a location associated with the customer, such as their home or work address, to perform the verification.

In block 1212, a reset response message is generated. Generating a reset message may include initializing a portion of memory with values that define the reset message. The reset response message indicates a result of the verification of the identification discussed above. As discussed above with respect to FIG. 9, the response message may be generated to include metadata, including at least one or more of a transaction identifier (matching a transaction identifier indicated in the corresponding DCR request), and/or a timestamp. In some aspects, the response message may include a digital credential reset dataset. As shown in the example of FIG. 9, in some aspects, the dataset may include one or more of a result indication, validation indication, and signature indication.

In block 1214, the response message is transmitted. In some aspects, the response message is transmitted to the online service provider 910 as shown in FIG. 9. In some aspects, transmitting the response includes writing the response message to a device driver, such as a network device driver. In some aspects, transmitting the message may include calling one or more sockets API function calls, such as connect( ) and/or send( ).

Figure 13:
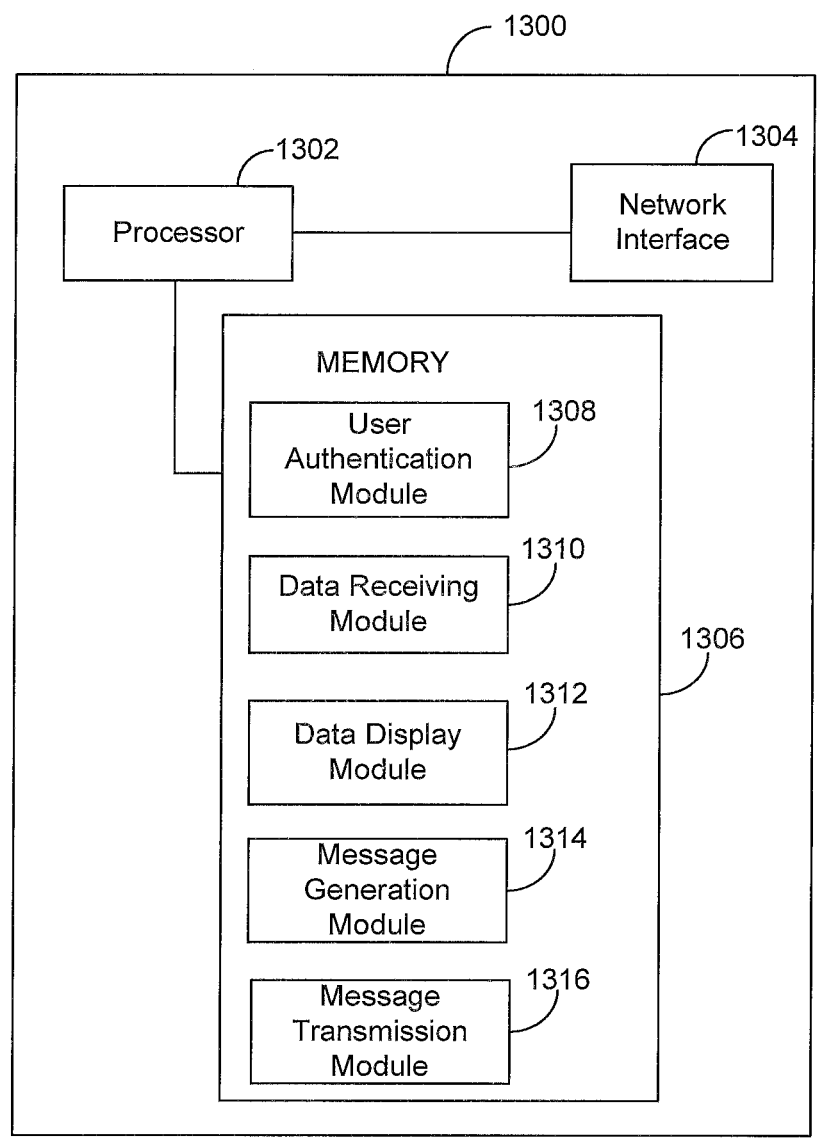
FIG. 13 is a functional block diagram of an apparatus that may be configured to perform one or more of the disclosed embodiments.

FIG. 13 is a functional block diagram of an apparatus that may be configured to perform one or more of the disclosed embodiments. The apparatus 1300 includes a hardware processor 1302, memory 1304 operably connected to the processor, and a network interface 1306 that is also operably connected to the processor. The memory stores instructions that configure the processor to perform operations. The instructions stored in the memory are organized into modules. Instructions in the user authentication module 1308 may configure the processor to perform one or more of the functions discussed above with respect to blocks 1202 and/or 1206 of FIG. 12. A data receiving module 1310 includes instructions that configure the processor to perform one or more of the functions discussed with respect to blocks 1204 and/or 1206 and/or 1210 of FIG. 12. In some aspects, means for receiving may include the instructions in the data receiving module 1310, along with the processor 1002 and memory 1304. A data display module 1312 may include instructions that configure the processor 1302 to perform one or more of the functions discussed above with respect to block 1208. In some aspects, a means for displaying may include the instructions included in the data display module 1312, along with the processor 1302. A message generation module 1312 includes instructions that configure the processor to perform one or more of the functions discussed above with respect to block 1212. In some aspects, means for generating a message may include instructions in the message generation module 1314, along with the processor 1302. The message transmission module 1314 includes instructions that configure the processor to perform one or more of the functions discussed above with respect to block 1214. In some aspects, means for transmitting includes instructions in the message transmission module, along with the processor 1302.

Those of skill will recognize that the various illustrative logical blocks, modules, circuits, and algorithm steps described as follows, and in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the development as applied to various embodiments, it will be understood that various omissions, substitutions, and changes in the form and details of the device or process illustrated may be made by those skilled in the art without departing from the spirit of the development. As will be recognized, the present development may be embodied within a form that does not provide all of the features and benefits set forth herein, as some features may be used or practiced separately from others. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX®, MacOS® or Microsoft Windows®.

The system control may be written in any conventional programming language such as C, C++, BASIC, Pascal, .NET (e.g., C#), or Java®, and ran under a conventional operating system. C, C++, BASIC, Pascal, Java®, and FORTRAN are industry standard programming languages for which many commercial compilers may be used to create executable code. The system control may also be written using interpreted languages such as Perl®, Python® or Ruby. Other languages may also be used such as PHP, JavaScript®, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being redefined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present development. This development is susceptible to modifications in the methods and materials, as well as alterations in the fabrication methods and equipment. Such modifications will become apparent to those skilled in the art from a consideration of this disclosure or practice of the development disclosed herein. Consequently, it is not intended that this development be limited to the specific embodiments disclosed herein, but that it cover all modifications and alternatives coming within the true scope and spirit of the development as embodied in the attached claims.

As will be understood by those of skill in the art, in some embodiments, the processes set forth in the following material may be performed on a computer network. The computer network having a central server, the central server having a processor, data storage, such as databases and memories, and communications features to allow wired or wireless communication with various parts of the networks, including terminals and any other desired network access point or means.

What is claimed is:

1. A method for improving the security of a digital credential based authentication system, the method comprising:
   receiving first login information and a first login location from a first administrative user;
   logging the first administrative user into the digital credential based authentication system based on the first login information;
   receiving, from the first administrative user, a first portion of authentication credentials for a first customer;
   validating, by the first administrative user using the digital credential system, the first portion;
   receiving second login information and a second login location from a second administrative user;
   logging the second administrative user into the digital credential system based on the second login information and based on a comparison of the first login location and the second login location;
   receiving, from the second administrative user, a second portion of authentication credentials for the first customer different from the first portion;
   validating, by the second administrative user using the digital credential system, the second portion; and
   resetting the authentication credentials based on the validation of the first portion and the second portion,
   wherein at least one of receiving the second portion from the second administrative user and validating the second portion by the second administrative user comprises receiving information from the first customer and occurs via a physical interaction while the first customer is at a physical location.

2. The method of claim 1, further comprising preventing validation of the second portion by the first administrative user.

3. The method of claim 1, further comprising:
   selecting, by the first administrative user, the physical location for validation of the second portion of the authentication credentials;
   verifying, by the digital credential system, that the receiving of the second portion of the authentication credentials occurs at the selected physical location; and
   validating, by the digital credential system, the second portion in response to verifying that the receiving of the second portion of the authentication credentials occurs at the selected physical location.

4. The method of claim 3, wherein verifying the receiving occurs at the selected physical location comprises receiving GPS coordinates from a terminal of the logged in second administrative user, and determining whether the received GPS coordinates are equivalent to the selected physical location.

5. The method of claim 1, wherein the first portion includes at least one or more of a first requestor name, a first customer account name, a first identification type, a first requestor address, a global positioning system coordinate, a first phone number, and a transaction address.

6. An apparatus for improving the security of a digital credential based authentication system, the apparatus comprising:
   one or more electronic hardware processors;
   a memory, operably connected to the one or more processors, and storing instructions that configure the one or more electronic hardware processors to:
   receive first login information and a first location from a first administrative user;
   log the first administrative user into the digital credential system based on the first login information;
   receive, from the first administrative user, a first portion of authentication credentials for a first customer;
   validate, by the first administrative user using the digital credential system, the first portion;
   receive second login information and a second location from a second administrative user;
   log the second administrative user into the digital credential system based on the second login information and based on a comparison of the first location and the second location;
   receive, from the second administrative user, a second portion of authentication credentials for the first customer different from the first portion;
   validate, by the second administrative user using the digital credential system, the second portion; and
   reset the authentication credentials based on the validation of the first portion and second portion,
   wherein at least one of receiving the second portion from the second administrative user and validating the second portion by the second administrative user comprises receiving information from the first customer and occurs via a physical interaction while the first customer is at a physical location.

7. The apparatus of claim 6, wherein the memory further stores instructions that configure the one or more electronic hardware processors to prevent validation of the second portion by the first administrative user in response to the validation of the first portion by the first administrative user.

8. The apparatus of claim 6, wherein the memory further stores instructions that configure the one or more electronic hardware processors to:
   select by the first administrative user, the physical location for validation of the second portion of the authentication credentials;
   verify, by the digital credential system, that the receiving of the second portion of the authentication credentials occurs at the selected physical location; and
   validate, by the digital credential system, the second portion in response to verifying that the receiving of the second portion of the authentication credentials occurs at the selected physical location.

9. The apparatus of claim 6, wherein verifying the receiving occurs at the selected physical location comprises receiving GPS coordinates from a terminal of the logged in second administrative user and determining whether the received GPS coordinates are equivalent to the selected physical location.

10. The apparatus of claim 6, wherein the first portion includes at least one or more of a first requestor name, a first customer account name, a first identification type, a first requestor address, a global positioning system coordinate, a first phone number, and a transaction address.

11. A method of improving the security of a web service accessible digital credential, the method comprising:
    validating, by a first administrative user, a first portion of authentication credentials for a first user;
    receiving, by a digital credential system, a login from the first administrative user via a first electronic device;
    receiving, by the digital credential system, a digital credential reset request message for a user account of the first user from the first administrative user, the message identifying a physical location to which at least one of a second administrative user or the first user travels to perform an identity verification of the first user using a second portion of the authentication credentials for the first user, and an identification type to use for the identity verification;
    receiving, via the digital credential system, a login from the second administrative user from a second electronic device at the identified physical location;
    displaying, via the digital credential system, at the second electronic device, an indication of the identification type to use for the identity verification;
    receiving, via the digital credential system, an indication of whether the indicated identification type was verified, wherein the indicated identification type was verified based on a physical interaction between at least one of the second administrative user or the second electronic device and the user while at the identified physical location;
    generating, via the digital credential system, a digital credential reset response message based on the verification indication; and
    transmitting, via the digital credential system, the digital credential reset response message.

12. The method of claim 11, further comprising displaying, at the second electronic device simultaneously with the indicated identification type, a photograph associated with the first user.

13. The method of claim 11, wherein the request message includes at least one of a customer name, a transaction code, a customer account name, a customer address, a transaction address, a global positioning system coordinate associated with the transaction address, and a customer phone number, associated with the first user.

14. The method of claim 11, wherein the indicated identification type is a government-issued identification that includes at least one of a photograph, a voice sample, a fingerprint, and a retinal scan.

15. An apparatus for improving the security of a digital credential, the apparatus comprising:
    one or more electronic hardware processors;
    a memory, operably connected to the one or more processors, and storing instructions that configure the one or more electronic hardware processors to:
        validate, by a first administrative user, a first portion of authentication credentials for a first user;
        receive, by a digital credential system, a login from the first administrative user via a first electronic device;
        receive, by the digital credential system, a digital credential reset request message for a user account of the first user from the first administrative user, the message identifying a physical location to which at least one of a second administrative user or the first user travel to perform an identity verification of the first user using a second portion of the authentication credentials for the first user, and an identification type to use for the identity verification;
        receive, via the digital credential system, a login from the second administrative user from a second electronic device at the identified physical location;
        display, via the digital credential system, at the second electronic device, an indication of the identification type to use for the identity verification;
        receive, via the digital credential system, an indication of whether the indicated identification type was verified, wherein the indicated identification type was verified based on a physical interaction between at least one of the second administrative user or the second electronic device and the user while at the identified physical location;
        generate, via the digital credential system, a digital credential reset response message based on the verification indication; and
        transmit, via the digital credential system, the digital credential reset response message.

16. The apparatus of claim 15, wherein the memory stores further instructions for the one or more processors that when executed, cause the one or more processors to display, at the second electronic device simultaneously with the indicated identification type, a photograph associated with the first user.

17. The apparatus of claim 15, wherein the request message includes at least one of a customer name, a transaction code, a customer account name, a customer address, a transaction address, a global positioning system coordinate associated with the transaction address, and a customer phone number, associated with the first user.

18. The apparatus of claim 15, wherein the indicated identification type is a government-issued identification that includes at least one of a voice sample, a photograph, a fingerprint, and a retinal scan.

19. The apparatus of claim 1, wherein the first login location is different from the second login location and wherein one or both of the first login location and the second login location is within a threshold distance of a location identified in a user account of the user.

* * * * *